US012434365B2

(12) United States Patent
McCardle et al.

(10) Patent No.: US 12,434,365 B2
(45) Date of Patent: Oct. 7, 2025

(54) MICROFASTENER DRIVING TOOL WITH GAS SPRING

(71) Applicant: Kyocera Senco Industrial Tools, Inc., Cincinnati, OH (US)

(72) Inventors: Thomas A. McCardle, Fairfield, OH (US); Christopher D. Klein, Cincinnati, OH (US)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 0 days.

(21) Appl. No.: 18/221,507

(22) Filed: Jul. 13, 2023

(65) Prior Publication Data

US 2024/0017387 A1 Jan. 18, 2024

Related U.S. Application Data

(60) Provisional application No. 63/461,961, filed on Apr. 26, 2023, provisional application No. 63/389,527, filed on Jul. 15, 2022.

(51) Int. Cl.
*B25C 1/04* (2006.01)

(52) U.S. Cl.
CPC .............. *B25C 1/041* (2013.01); *B25C 1/047* (2013.01)

(58) Field of Classification Search
None
See application file for complete search history.

(56) References Cited

U.S. PATENT DOCUMENTS

| | | | |
|---|---|---|---|
| 860,536 | A | 7/1907 | Ellingham |
| 1,774,967 | A | 9/1930 | Ellis |
| 2,575,455 | A | 11/1951 | Lang |

(Continued)

FOREIGN PATENT DOCUMENTS

| | | |
|---|---|---|
| DE | 1503164 | 3/1970 |
| DE | 8711784 | 8/1987 |
| GB | 1559571 | 1/1980 |

OTHER PUBLICATIONS

International Search Report for PCT/US23/27596, mailed Dec. 20, 2023; 15 pages.

(Continued)

*Primary Examiner* — Tanzim Imam
(74) *Attorney, Agent, or Firm* — Frederick H. Gribbell; Russell F. Gribbell; William E. Crouse

(57) ABSTRACT

A portable linear fastener driving tool is provided that drives staples, nails, pins, or other linearly driven fasteners. The tool uses a gas spring principle, in which a cylinder filled with compressed gas is used to quickly force a piston through a driving stroke movement, while a driver also drives a fastener into a workpiece. The piston/driver is then moved back to its starting position by use of a rotary-to-linear lifter, and the piston further compresses the gas above the piston, thereby preparing the tool for another driving stroke. In an illustrated embodiment, the tool exhibits an inverted U-shape tri-chamber design for the central cylinder, a left-side pressure chamber, and a right-side pressure chamber. In one illustrated embodiment, the lifter motor is configured to have its longitudinal axis substantially parallel to the longitudinal axis of the working cylinder, thereby making this tool more compact. Other embodiments show the angle to be between 0-90 degrees.

7 Claims, 23 Drawing Sheets

(56) References Cited

U.S. PATENT DOCUMENTS

| | | | |
|---|---|---|---|
| 2,814,041 | A | 11/1957 | Haley |
| 2,933,290 | A | 4/1960 | Ryder |
| 3,150,488 | A | 9/1964 | Haley |
| 3,589,588 | A | 6/1971 | Vasku |
| 3,847,322 | A | 11/1974 | Smith |
| 3,878,902 | A | 4/1975 | Matsuo |
| 3,913,685 | A | 10/1975 | Enstrom |
| 3,924,692 | A | 12/1975 | Saari |
| 4,203,353 | A | 5/1980 | Bernham et al. |
| 4,215,808 | A | 8/1980 | Sollberger et al. |
| 4,530,455 | A | 7/1985 | Vornberger |
| 4,741,518 | A | 5/1988 | Wallis |
| 5,199,627 | A | 4/1993 | Christensen |
| 5,503,319 | A | 4/1996 | Lai |
| 5,605,268 | A | 2/1997 | Hayashi |
| 5,720,423 | A | 2/1998 | Kondo et al. |
| 6,533,156 | B1 | 3/2003 | Chang |
| 6,669,072 | B2 | 12/2003 | Burke |
| 6,938,811 | B2 | 9/2005 | Ehmig et al. |
| 6,997,367 | B2 | 2/2006 | Hu |
| 7,040,521 | B2 | 5/2006 | Kolodziej et al. |
| 7,225,961 | B1 | 6/2007 | Lee |
| 7,225,962 | B2 | 6/2007 | Porth et al. |
| 7,494,036 | B2 | 2/2009 | Shima |
| 7,845,532 | B2 | 12/2010 | Burke |
| 8,011,547 | B2 | 9/2011 | Leimbach |
| 10,842,318 | B2 | 11/2020 | Koki |
| 2003/0218042 | A1 | 11/2003 | Odoni et al. |
| 2005/0082334 | A1 | 4/2005 | Hu |
| 2005/0217875 | A1 | 10/2005 | Forster |
| 2006/0180631 | A1 | 8/2006 | Pedicini |
| 2007/0007319 | A1 | 1/2007 | Simonelli |
| 2007/0045377 | A1 | 3/2007 | Towfighi |
| 2008/0041914 | A1 | 2/2008 | Simonelli |
| 2008/0067213 | A1 | 3/2008 | Shima |
| 2008/0190988 | A1 | 8/2008 | Pedicini |
| 2016/0288305 | A1* | 10/2016 | McCardle ................. B25C 1/06 |
| 2018/0178361 | A1* | 6/2018 | Kabbes ................... B25C 1/008 |
| 2019/0126452 | A1* | 5/2019 | Po ........................... B25C 1/042 |
| 2019/0321955 | A1* | 10/2019 | Carrier ...................... B25C 1/04 |
| 2020/0070330 | A1* | 3/2020 | Carrier ................... H02K 11/30 |
| 2021/0308849 | A1 | 10/2021 | Bornemann |

OTHER PUBLICATIONS

International Search Report, PCT/US2008/078408, 10 pages (Dec. 8, 2008).

Two-page "Tool Assembly" drawing of Senco Model No. SN952XP pneumatic tool; dated Mar. 4, 2008; representative of earlier tools in public use before 2006; Admitted Prior Art.

One-page magnified view of "Tool Assembly" drawing of Senco Model No. SN952XP pneumatic tool; Mar. 4, 2008; representative of earlier tools in public use before 2006; Admitted Prior Art.

European Search Report for EP 08 83 4872, Nov. 19, 2015.

Sixteen page Operating Instructions for Senco AirFree 41 Cordless Finish Nailer, Sep. 7, 2001. Note: this is an old "flywheel" tool—see U.S. Pat. No. 6,669,072.

Four page Parts Reference Guide for Senco AirFree 41 Cordless Finish Nailer; 2004. Note: this is an old "flywheel" tool—see U.S. Pat. No. 6,669,072.

Four page Parts Reference Guide for Senco Cordless Finish 41 15 ga. Finish Nailer, 2008. Note: this is an old "flywheel" tool—see U.S. Pat. No. 6,669,072.

* cited by examiner

MICROFASTENER DRIVING TOOL WITH GAS SPRING

CROSS-REFERENCE TO RELATED APPLICATIONS

The present application claims priority to provisional patent application Ser. No. 63/389,527, titled "MICROFASTENER DRIVING TOOL WITH GAS SPRING," filed on Jul. 15, 2022; and claims priority to provisional patent application Ser. No. 63/461,961, titled "MICROFASTENER DRIVING TOOL WITH GAS SPRING," filed on Apr. 26, 2023.

TECHNICAL FIELD

The technology disclosed herein relates generally to fastener driving tools and is particularly directed to micropinners of the type which fire small pins into a substrate material. Embodiments are specifically disclosed as fastener driving tools having a sealed pressure chamber containing compressed gas, a working cylinder that includes a piston with a connecting driver, a removable battery pack, and an electrically powered lifter subassembly, thus providing a reusable gas spring that, when actuated, drives small pins into a substrate. The upper chamber of the working cylinder (a "variable displacement volume") is in fluidic communication with the pressure chamber, thereby sharing the compressed gas; this compressed gas is not vented to atmosphere during a drive stroke, but instead is re-used many, many times for thousands of drive strokes.

The fastener driving tool includes a self-contained pressured gas stored in the sealed pressure chamber. Actuating a trigger on the tool rotates a rotary-to-linear lifter that holds the piston and driver in a "ready position." The compressed gas then forces the piston and driver towards an exit end of the tool with sufficient force to drive a small fastener (such as a pin) into a substrate; this actuation procedure is sometimes referred to herein as a "drive stroke."

After the drive stroke, the lifter subassembly is actuated automatically. The lifter subassembly includes a plurality of lifter pins positioned around at least one lifter disk. The driver includes a plurality of lifter "teeth," or protrusions, that the lifter pins "catch" during a "return stroke." During a return stroke, the lifter disk rotates, which forces a lifter pin to "catch" and start "lifting" a first driver protrusion. The lifter disk continues to rotate, and consecutive lifter pins catch and lift consecutive driver protrusions. The return stroke ends when the piston and driver are positioned back in the ready position. The drive stroke begins again, using the same compressed gas. As noted above, the compressed gas is generally reusable for hundreds or thousands of drive strokes.

The fastener driving tool is generally a portable cordless tool that drives staples, nails, pins, or other linearly driven fasteners. The tool is also specifically disclosed as a gas spring linear fastener driving tool, in which the working cylinder filled with compressed gas is used to quickly force its piston through a driving stroke movement, while also driving a fastener into a workpiece. The piston is then moved back to its starting position by use of the rotary-to-linear lifter, which further compresses the gas above the piston, thereby preparing the tool for another driving stroke. A driver is typically attached to the piston (at least during the drive stroke), and has protrusions along one of its surfaces that are used to contact the lifter, which lifts the driver (and piston) during a return stroke.

STATEMENT REGARDING FEDERALLY SPONSORED RESEARCH OR DEVELOPMENT

None.

BACKGROUND

Microfastener tools for driving nails, staples, or pins are common. Typically, such tools are used in conjunction with an external pressurized gas source, such as an air compressor with a hose, and do not include a removable battery pack. The tools also typically include a housing, a firing valve, and a cylinder containing a piston and a driver blade, which is used to sequentially drive staples, nails, or pins into a substrate.

A common problem with these types of tools is the need for an external pressurized gas source in order to operate the tool. In order to operate the tool, a user must bring a heavy, awkward compressed gas unit with an air hose along with the typically small and lightweight microfastener tool. Plus, during actual operation, the user must keep in mind the hose connecting the external compressed gas unit with the microfastener tool, because if the hose is damaged or disconnected, the tool will no longer operate.

Another aspect of the conventional FUSION-type tools that are sold today is that the lifter motor and its drive train to the actual lifter is oriented at a perpendicular angle with respect to the longitudinal axis of the working cylinder. (A FUSION® is a hybrid fastener driving tool first invented by Senco Products, Inc., which uses a pressurized gas spring to power a drive stroke, but uses electrical power to lift the driver and piston back to their "ready position.") The perpendicular lifter motor limits (expands) the profile of the tool on its sides near the front of the conventional FUSION-style tools, which becomes a greater working space issue when the motor housing is somewhat offset to the side of the main centerline of the tool.

SUMMARY

Accordingly, it is an advantage to provide a fastener driving tool that operates on a gas spring principle, in which the cylinder that contains the moving piston and driver is at least partially surrounded by at least one pressure vessel (as a main storage chamber) to increase the storage space of the pressurized gases needed for the gas spring effect.

It is another advantage to provide a fastener driving tool that uses a gas spring principle to provide a quick downward driving stroke, and uses an electrically-powered rotary-to-linear lifter that uses multiple lifter pins that contact and lift the driver and the piston back to their ready position.

It is still a further advantage to provide a fastener driving tool that operates on a gas spring principle, in which there is a "working storage volume" comprising a combination of two physically separate storage chambers and a variable displacement volume of the working cylinder.

It is yet another advantage to provide a fastener driving tool that operates on a gas spring principle, in which the lifter motor and its drive train to the actual lifter mechanism is mechanically arranged to be substantially parallel to a longitudinal axis of the working cylinder, and this provides a more compact tool for most of its working parts.

It is yet a further advantage to provide a fastener driving tool that operates on a gas spring principle, in which the lifter motor and its drive train to the actual lifter mechanism is mechanically arranged to be at an angle that is neither parallel to nor perpendicular to a longitudinal axis of the working cylinder, which may help to cool the lifter motor, and/or will help to adjust the center of mass of the overall tool.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a pressurized gas system for a portable fastener driving tool is provided, which comprises: a pressure chamber including a first side storage chamber, and a second side storage chamber; a working cylinder that includes a movable piston, in which the working cylinder exhibits a first end and a second, opposite end, and a longitudinal axis that extends at least between the first end and the second end; wherein: the pressure chamber extends along the longitudinal axis of the working cylinder, and exhibits an inverted U-shape in transverse cross-section, in which there is a top bend portion, a first extended leg, and a second extended leg; the working cylinder is located proximal to the top bend portion of the inverted U-shape; the first side storage chamber is located at the first extended leg of the inverted U-shape, and longitudinally extends along a first side portion of the working cylinder; the second side storage chamber is located at the second extended leg of the inverted U-shape, and longitudinally extends along a second side portion of the working cylinder; the first side storage chamber and the second side storage chamber are operable to be in fluidic communication with at least a portion of the working cylinder; and the pressure chamber is operable to contain pressurized gas.

In accordance with another aspect, a portable fastener driving tool is provided, which comprises: a pressure chamber containing a pressurized gas; a working cylinder that includes a movable piston, in which the working cylinder exhibits a first end and a second, opposite end, and a first longitudinal axis that extends at least between the first end and the second end; a movable driver that is in communication with the piston at least during a drive stroke; a lifter that is in communication with the driver at least during a return stroke; and a motor that provides power to the lifter, the motor exhibiting a second longitudinal axis; wherein: the first longitudinal axis is substantially parallel to the second longitudinal axis.

In accordance with yet another aspect, a portable fastener driving tool is provided, which comprises: a pressure chamber containing a pressurized gas; a working cylinder that includes a movable piston, in which the working cylinder exhibits a first end and a second, opposite end, and a first longitudinal axis that extends at least between the first end and the second end; a movable driver that is in communication with the piston at least during a drive stroke; a lifter that is in communication with the driver at least during a return stroke; and a motor that provides power to the lifter, the motor exhibiting a second longitudinal axis; wherein: the first longitudinal axis is oriented at an angle to the second longitudinal axis, in which the angle is in the range of about 1 degree to about 15 degrees.

In accordance with still another aspect, a portable fastener driving tool is provided, which comprises: a pressure chamber including a first side storage chamber, and a second side storage chamber; a working cylinder that includes a movable piston, in which the working cylinder exhibits a first end and a second, opposite end, and a longitudinal axis that extends at least between the first end and the second end; a movable driver that is in communication with the piston at least during a drive stroke; a lifter that is in communication with the driver at least during a return stroke; a guide body with a linear passageway for the driver, the guide body being located proximal to the first end of the working cylinder; a motor; and a tri-chamber seal, exhibiting a central O-ring portion that seats around the working cylinder, a left ear-shape seal portion that seats around the first side storage chamber, and a right ear-shape seal portion that seats around the second side storage chamber; wherein: the tri-chamber seal is located proximal to the first end.

In accordance with a further aspect, a portable fastener driving tool is provided, which comprises: a pressure chamber containing a pressurized gas; a working cylinder that includes a movable piston, in which the working cylinder exhibits a first end and a second, opposite end, and a first longitudinal axis that extends at least between the first end and the second end; a movable driver that is in communication with the piston at least during a drive stroke; a lifter that is in communication with the driver at least during a return stroke; and a motor and a gear train that provides power to the lifter, at least one of the motor and the gear train exhibiting a second longitudinal axis; wherein: the first longitudinal axis is oriented at an angle to the second longitudinal axis, in which the angle is not 90 degrees.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
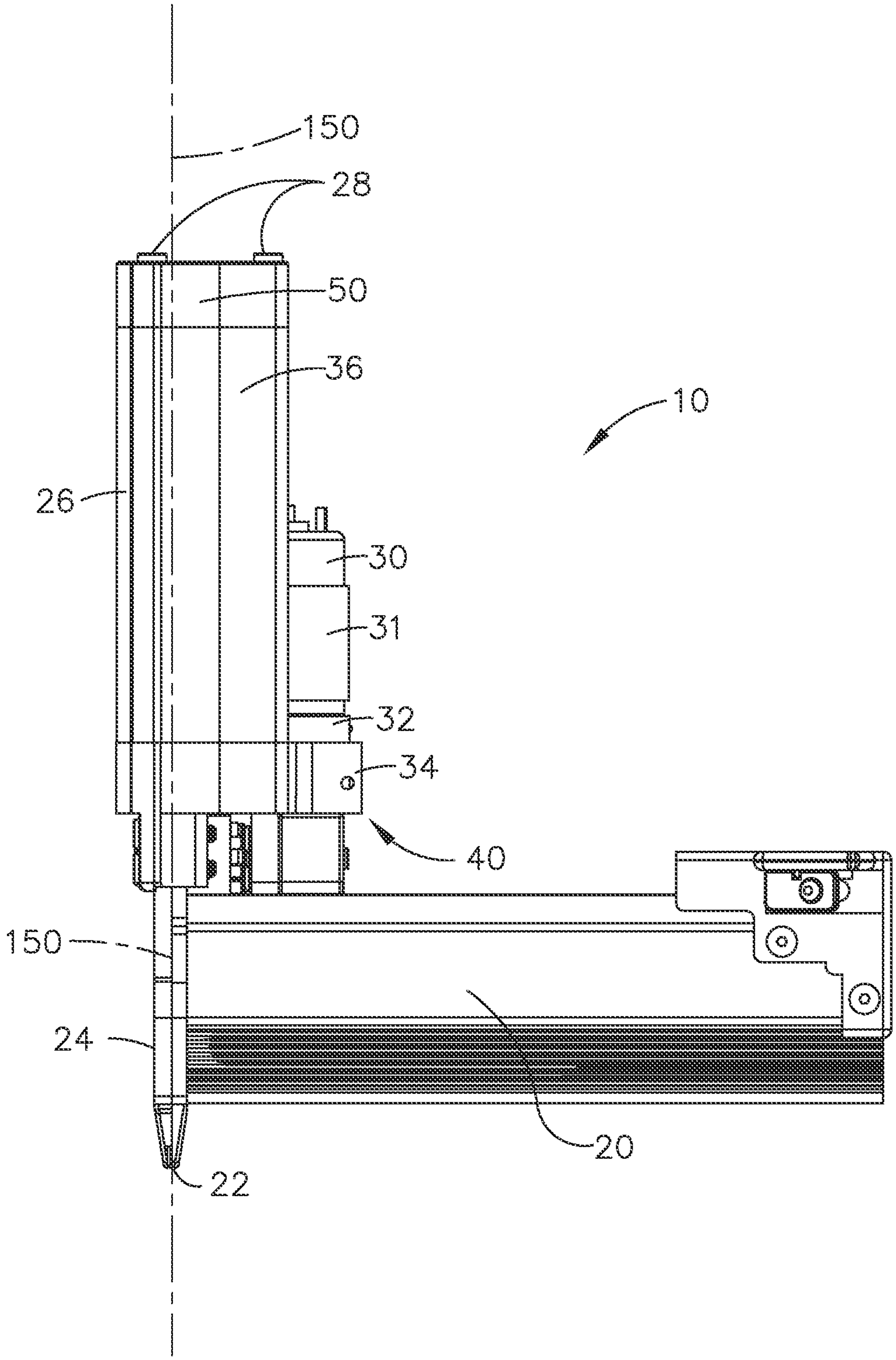
FIG. 1 is a left side elevational view of a fastener driving tool shown without its outer housing, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

Referring now to FIG. 1, a fastener driving tool is generally designated by the reference numeral 10. The tool 10 has a magazine 20 that holds a plurality of fasteners, a guide body 24 near the front end, an exit end 22, and a first longitudinal axis 150. An outer front wall 26, a left-side pressure chamber outer wall 36, and a right-side pressure chamber wall 38 (see FIG. 2) are positioned in an inverted "U-shape" in transverse cross-section (see FIG. 3) and partially wrapped around a motor 30, a motor housing 31, a gearbox housing 32, and a chassis 34. The motor 30, the motor housing 31, the gearbox housing 32, and the chassis 34 are positioned somewhat in the inverted U-shaped "bend" portion of the "U." The chassis 34 is part of a chassis subassembly ("S/A") 40, which will be described in further detail below. The motor 30 includes a rotating portion and a stationary portion.

An upper pressure chamber end (also sometimes referred to herein as an "end cap") 50 is secured (via a plurality of fasteners 28) to the end of the outer front wall 26, the left-side pressure chamber outer wall 36, and the right-side pressure chamber outer wall 38 (not shown in this view). The end cap 50 and the chassis S/A 40 provide an air-tight seal at the outer walls 26, 36, and 38.

Figure 2:
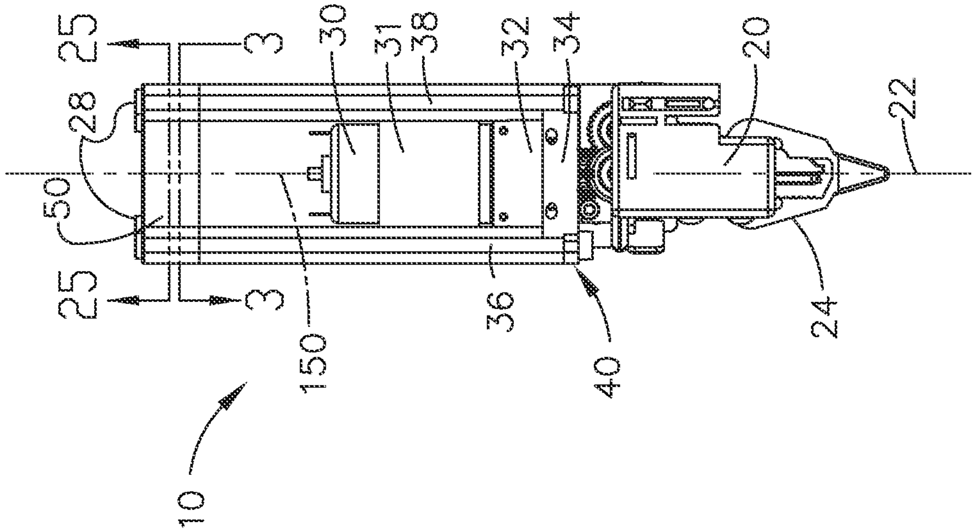
FIG. 2 is a bottom view of the fastener driving tool of FIG. 1.

Referring now to FIG. 2, a bottom view of the tool 10 is depicted. In this view, the left-side pressure chamber outer wall 36 and the right-side pressure chamber outer wall 38 are shown partially "wrapped around" the motor 30 in an inverse U-shape. Note that the outer front wall 26 (not shown in this view) is above the motor 30, and forms the "top" of the inverse U-shape. The outer front wall 26 and a pressure chamber interior wall 25 comprises a cylinder chamber 56 (also sometimes referred to herein as a "hollow cylinder" or "working cylinder"), which includes a piston 60 and a driver 62 (see FIG. 5). The working cylinder 56 extends between a first end and a second, opposite end of the longitudinal axis 150. The first end is proximal to the guide body 24, and the second is proximal to the end cap 50.

The movable piston 60 exhibits a reciprocating motion that has a first end travel position and a second, opposite end travel position such that the piston 60 movements between the first and second end travel positions define a variable venting volume 142 on a first side of the piston 60 that is proximal to the first end of the working cylinder 56, and a variable displacement volume 166 on a second side of the piston 60 that is proximal to the second end of the working cylinder 56. The variable displacement volume 166 is pneumatically separated from the variable venting volume 142 by the piston 60.

Figure 3:
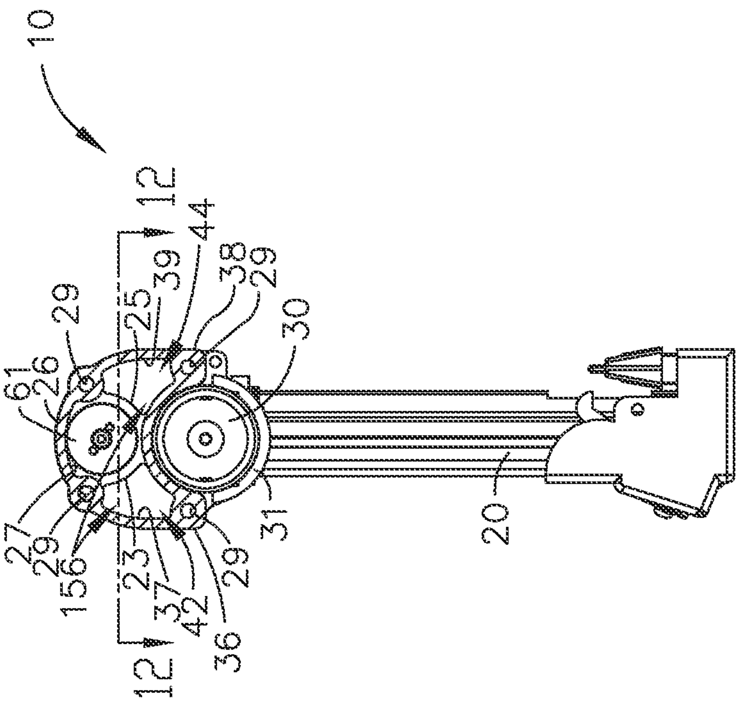
FIG. 3 is a rear cutaway view along the section line 3-3 of FIG. 2 of the fastener driving tool of FIG. 1.

The left-side pressure chamber outer wall 36 contains a left-side pressure chamber 42 (see FIG. 3), and the right-side pressure chamber outer wall 38 contains a right-side pressure chamber 44 (see FIG. 3). The left-side pressure chamber 42 is sometimes referred to herein as a "first side storage chamber," and the right-side pressure chamber 44 is sometimes referred to herein as a "second side storage chamber." Each pressure chamber 42 and 44 is filled with pressurized gas during manufacture of the tool. The inverse U-shape is a "tri-chamber" design with the cylinder chamber 56 at the "bend" or "top" of the inverse U-shape, and the left-side pressure chamber 42 and the right-side pressure chamber 44 as the "ends" or "straights" of the inverse U-shape. The "straights" of the inverse U-shape will sometimes be referred to herein as "extended legs." The right-side and left-side pressure chambers 44 and 42 extend between the first end and the second, opposite end of the longitudinal axis 150. The left-side pressure chamber 42 extends along a first side portion of the working cylinder 56, and the right-side pressure chamber 44 extends along a second side portion of the working cylinder 56.

The end cap 50 exhibits a mating surface to the first side storage chamber 42, the second side storage chamber 44, and the working cylinder 56. It will be understood that the first side storage chamber 42 and the second side storage chamber 44 are not operable to be in fluidic communication with each other except at a space that is proximal to the second end of the working cylinder 56. The first side storage chamber 42, the second side storage chamber 44, and the working cylinder 56 all mount to the guide body 24.

Referring now to FIG. 3, the inverse U-shape tri-chamber design is depicted in a rear cutaway view along the section line 3-3 of FIG. 2, and also is depicted in a cutaway view of the end cap 50 along the section line 25-25 of FIG. 2. In FIG. 3, the outer front wall 26 exhibits an inner cylinder wall 27 and, along with the pressure chamber interior wall 25, comprises the cylinder chamber 56. A top portion 61 of the piston 60 is depicted positioned inside the cylinder chamber 56.

The left-side pressure chamber outer wall 36 exhibits a left-side pressure chamber inner wall 37 and, along with the left-side pressure chamber interior wall 23, comprises the left-side pressure chamber 42. Similarly, the right-side pressure chamber outer wall 38 exhibits a right-side pressure chamber inner wall 39 and, along with the right-side pressure chamber interior wall 25, comprises the right-side pressure chamber 44. A plurality of fastener receptacles 29 engage with the plurality of fasteners 28 to secure the end cap 50 to the tool 10.

It will be understood that the left-side pressure chamber 42, the right-side pressure chamber 44, and the end cap 50 create a "single chamber" for purposes of storing the pressurized gas. This single chamber is referred herein to as a "main pressure storage chamber" 156, and includes the variable displacement volume 166 and also the interior volume 140 of the end cap 50 (discussed below). The volume beneath the piston 60 is referred to as the variable venting volume 142, in which the gas beneath the piston 60 is expelled from the tool 10 during a drive stroke, and then refilled (from the external environment) during a lift stroke. The variable venting volume 142 gas is typically at atmospheric pressure (unless the tool is used in outer space).

It will be further understood that the main pressure storage chamber 156 and the variable displacement volume 166 (see FIG. 11) are pressurized at all times during an operating cycle of the tool 10. In other words, the pressurized gas that is initially stored in the main pressure storage chamber 156 is not vented to atmosphere at the end of a driving stroke, but instead is re-used for many, many operational cycles of the tool 10. This is quite unlike a typical "air tool" that is connected to a compressed air hose (or to a pressurized air or gas bottle), which requires a new charge of compressed air or compressed gas for each new driving stroke.

Instead of operating like a typical "air tool," the pressurized gas system used for the fastener driving tool 10 disclosed herein functions in a similar manner to a Senco FUSION® tool, which is a hybrid type of tool that uses electrical power supplied by a battery pack to "lift" the driver back toward its "Ready" position, but uses gas pressure to "drive" the driver toward the target substrate (i.e., toward its "Driven" position) as it drives a fastener into that substrate. The pressurized gas system disclosed herein is designed to maintain its pressure for thousands of operational cycles before the tool may need to be recharged with additional pressurized gas. This is a feature that the tool 10 has in common with the Senco product line of FUSION tools.

In view of the above, it will be further understood that—after the tool 10 has been charged with a pressurized gas—the combination of the main pressure storage chamber 156 and the variable displacement volume 166 of a working cylinder 154 (which are in fluidic communication at all times) will exert a gas pressure on the 'upper' surface 61 of the piston 60 at all times, including during a lift stroke. When the piston 60 is at its 'bottom' end travel (i.e., proximal to, or at, its "Driven position") the system gas pressure will be at its minimum magnitude, which however, is still at a considerable pressure so as to be able to fully drive a fastener into the target substrate during a driving stroke. As the driver 62 is lifted (during a "Return" stroke), the 'upward' movement (in some of the views herein) of the piston 60 will compress the gas molecules in the combined spaces of the main pressure storage chamber 156 and the variable displacement volume 166 until the piston 60 reaches its 'top' end travel (i.e., proximal to, or at, its "Ready position"), at which point the system gas pressure will be at its maximum magnitude.

Since the pressurized gas system of this tool 10 is always under pressure, care must be taken to disassemble the tool 10, in case of some type of repair is needed. One cannot merely 'pop open' the tool 10, since there may well be over 100 PSI of pressure being contained in that pressurized gas system. This will be true even if the gas pressure has slowly decreased to a point in which the tool 10 will not properly drive a fastener—there will still be considerable pressure contained within this tool 10, even in that circumstance. Therefore, a disassembly procedure must be implemented to de-pressurize the tool 10 before attempting to 'open' the tool so as to expose its moving parts in the working cylinder 154 area; moreover, an authorized service center may need to perform any such disassembly procedure.

In FIG. 3, the top surface 61 of the piston 60 is the bottom of the variable displacement volume 166, bounded on each side by the left-side pressure chamber 42 and the right-side pressure chamber 44. Those three volumes comprise the inverse U-shape tri-chamber design of the tool 10. This inverse U-shape tri-chamber design is unique compared to prior gas spring tool designs. For example, U.S. Pat. No. 8,011,547, owned by Kyocera Senco Industrial Tools, Inc., discloses a fastener driving tool having a cylinder chamber and piston that are essentially surrounded by an annular-shaped pressure chamber.

The pressure chamber interior wall 25 does not extend as far as the inner walls of the left and right-side pressure chambers 42 and 44. This is by design, so that the pressurized gas stored in the left and right-side pressure chambers 42 and 44 is allowed to flow into the cylinder chamber 56 during a drive stroke. The pressurized gas forces the piston 60 and the driver 62 towards the exit end 22, which then drives a fastener into a substrate.

It will be understood that the cylinder chamber 56, the left-side pressure chamber 42, and the right-side pressure chamber 44 are in fluidic communication with one another via the end cap 50. It will also be understood that the portion of the inner cylinder wall 27 and the pressure chamber interior wall 25—which is also the working cylinder's outer wall forms—a displacement volume that is created by the stroke of the piston 60. In other words, the gas pressure chamber 56 is not a fixed volume, but this chamber will vary in volume as the piston 60 moves up and down. This type of mechanical arrangement is often referred to as the variable displacement volume 166, and that terminology will mainly be used herein for this non-fixed volume.

It will be further understood that the left-side pressure chamber 42 and the right-side pressure chamber 44 preferably comprises a fixed volume, which typically would make it less expensive to manufacture; however, it is not an absolute requirement that the left-side and right-side pressure chambers actually be of a fixed volume. It would be possible to allow a portion of either chamber 42 and 44 to deform in size and/or shape so that the size of its volume would actually change, during operation of the present invention, without departing from the principles of the present invention.

Figure 4:
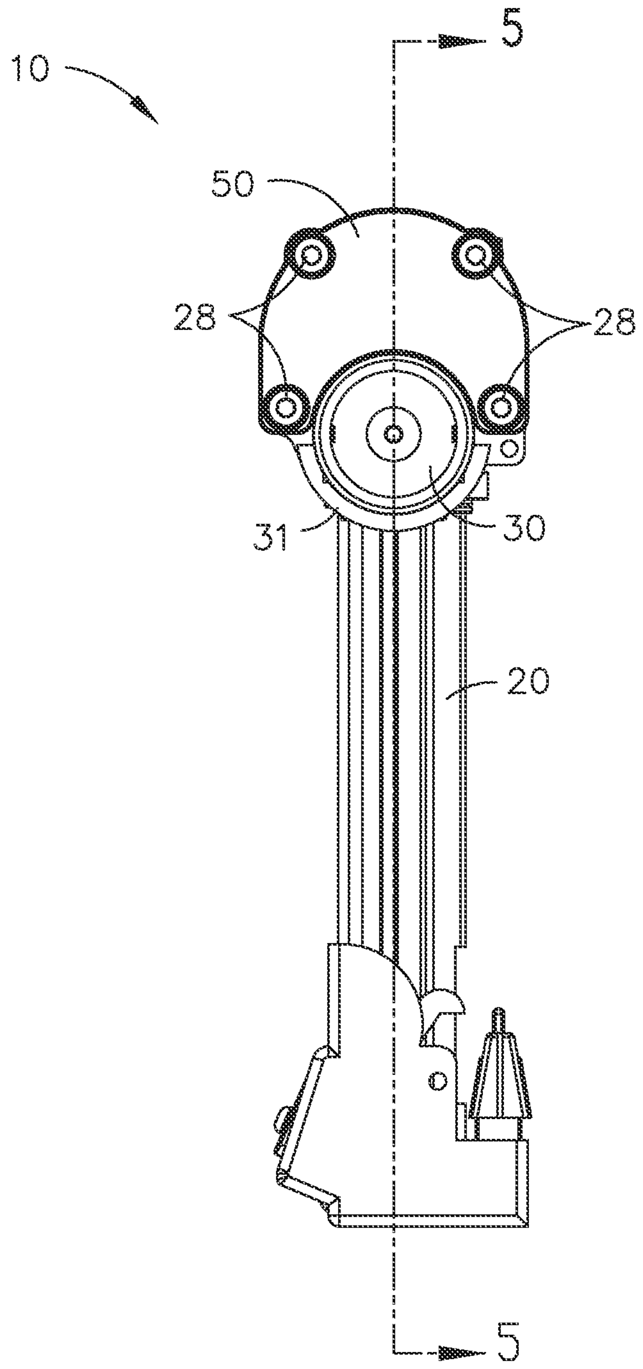
FIG. 4 is a rear elevational view of the fastener driving tool of FIG. 1.

Referring now to FIG. 4, the end cap 50 is depicted fully secured to the tool 10. In FIG. 4, the end cap 50 is clearly shown having an inverted U-shape matching the tri-chamber design of the tool 10. The fasteners 28 secure the end cap 50 to the tool 10. It will be understood that the internal volume 140 of the end cap 50 is a portion of the overall main pressure storage chamber 156 of the fastener driving tool 10. In other words, the end cap internal chamber 140 is in fluidic communication with the left-side 42 and right-side 44 pressure chambers, and these combined volumes create a fixed volume storage space for the compressed gas.

Figure 5:
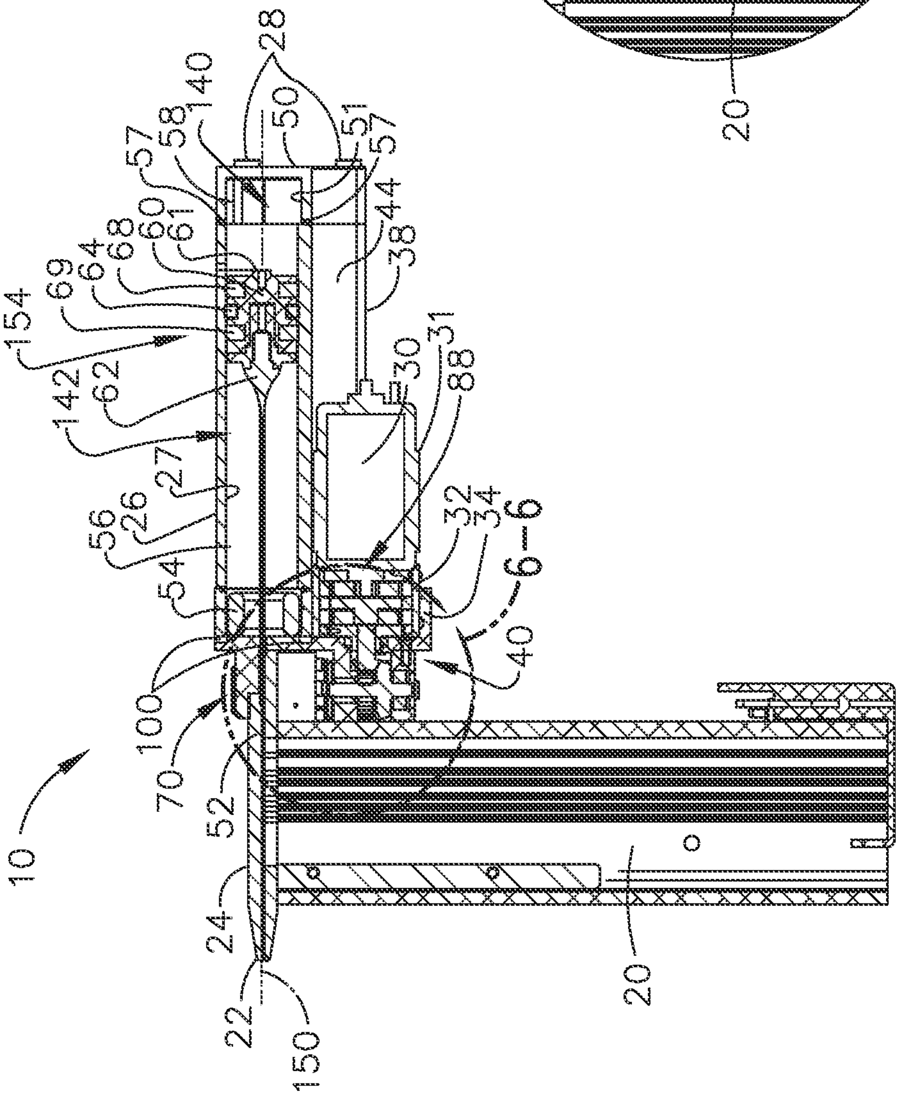
FIG. 5 is a left side cutaway view along the section line 5-5 of FIG. 4 of the fastener driving tool of FIG. 1.

Referring now to FIG. 5, the tool 10 is depicted in a left side cutaway view along the section line 5-5 of FIG. 4. The piston 60 includes a seal 64, an upper foam piece 68, and a lower foam piece 69. The driver 62 is threadingly secured to the piston 60. The driver 62 moves through a piston stop or bumper 54 and a guide body 52 when driving a fastener into a workpiece. The guide body 52 exhibits a linear passageway for the driver 62. The driver 62 exhibits a plurality of spaced-apart protrusions 63, also sometimes referred to herein as "teeth" (see FIG. 12).

Generally speaking, the interior space of the end cap 50 contains an "upper pressure chamber," which will be referred to herein as 140. A land 58 for one of the end cap fasteners 28 is shown. An upper pressure chamber end seal 57 is positioned where the end cap 50 is attached to the tool 10. The end cap 50 exhibits an inner wall 51. The gases in the upper pressure chamber portion 140 will generally mix with some of the pressured gas stored in the left-side pressure chamber 42 and the right-side pressure chamber 44. As discussed above, the working cylinder outer wall 25 does not extend to the upper pressure chamber inner wall 51. This allows the pressurized gas to flow from the left and right-side pressure chambers 42 and 44 into the upper pressure chamber 140, and those combined gases are able to force the piston 60 and the driver 62 towards the exit end 22 during a drive stroke.

Figure 8:
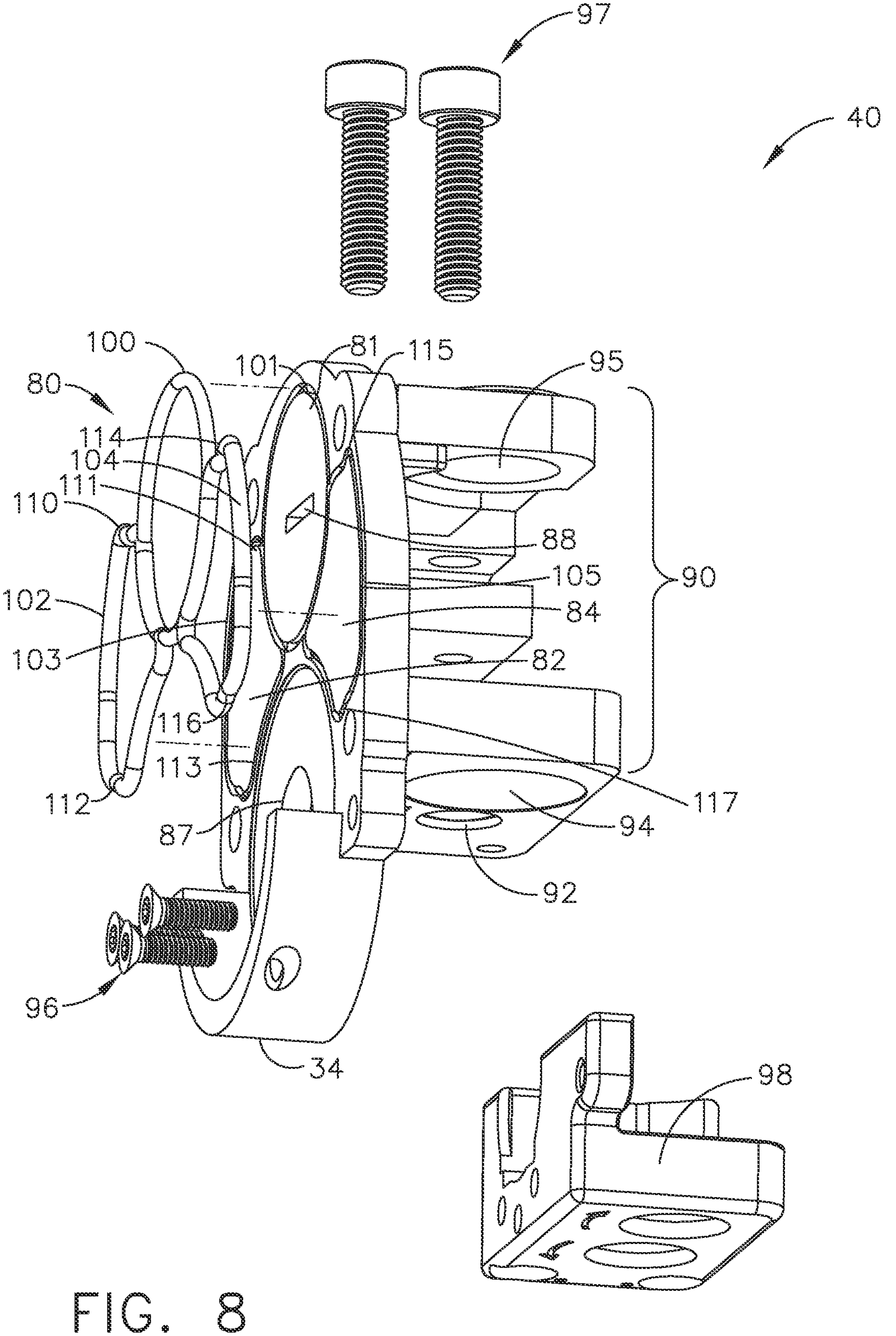
FIG. 8 is an exploded view of the front seal seat subassembly of the fastener driving tool of FIG. 1.

Proximal to the piston stop 54 is an O-ring portion 100, which is part of a tri-chamber seal (or gasket) 80—see FIG. 8. Proximal to, and outside of, the cylinder chamber 56 is a rotatable lifter sub-assembly ("S/A") 70. A gear train sub-assembly ("S/A") 86 is in mechanical communication with the motor 30, and the gearbox 86 includes an output shaft with a pinion gear 47 (see FIGS. 6 and 9).

Figure 6:
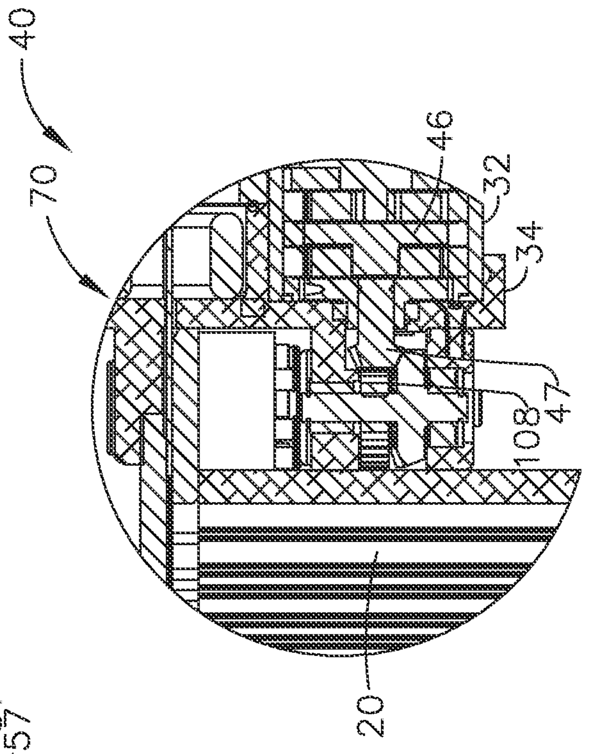
FIG. 6 is an enlarged side view along the circle 6-6 of FIG. 5 of the fastener driving tool of FIG. 1.

Referring now to FIG. 6, the chassis S/A 40 is shown in an enlarged view. A drive spur gear 48 is in mechanical communication with the pinion gear 47 (see FIG. 9), through a first spur gear with integral shaft 108. In FIG. 6, a bevel gear with integral shaft 108 is depicted. The driven spur gear 49 is in mechanical communication with the pinion gear 47, and the driven spur gear 49 rotates a lifter shaft 79 during a return stroke. The pinion gear 47 is in mechanical communication with a bevel gear 108. The bevel gear 108, the drive spur gear 48 and the driven spur gear 49 are at a 90° angle to the pinion gear 47. In other words, the orientation of the pinion gear 47 is perpendicular to the first spur gear 108 and the lifter gear 49.

During a return stroke, the motor 30 is energized, rotating the gear train S/A 86, which rotates the pinion gear 47. Pinion gear 47 turns the gear/shaft 108, which drives gear 48 via a keyed connection. The drive spur gear 48 then drives the driven spur gear 49. Thus, the drive spur gear 48 and the driven spur gear 49 concurrently rotate with the pinion gear 47. At the same time, the lifter shaft 79 rotates, which rotates a lifter cover plate 76 and a lifter base 74 (see FIG. 9). The lifter base 74 and the lifter cover plate 76 hold a plurality of lifter pins or extensions 72. The plurality of lifter pins 72 sequentially engage (or "catch") and "lift" the driver teeth 63 so as to lift the driver 62 back to its ready position. A shuttle return spring 78 is positioned on the lifter shaft 79 between the lifter cover plate 76 and the lifter base 74.

Figure 7:
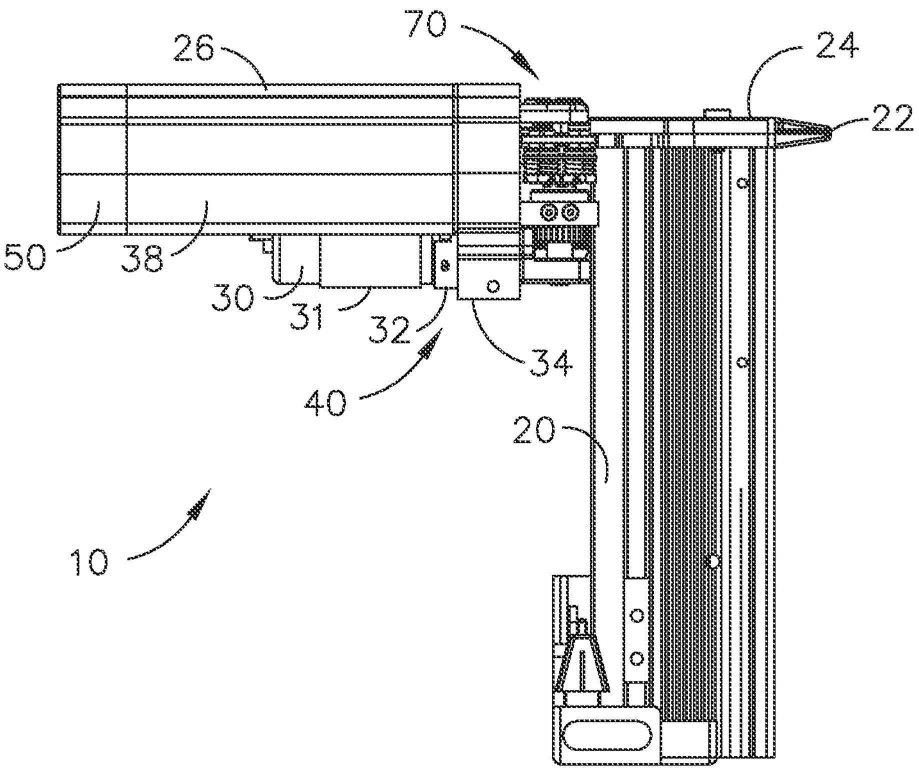
FIG. 7 is a right side elevational view of the fastener driving tool of FIG. 1 without its outer housing.

Referring now to FIG. 7, the tool 10 is depicted in a partial right side view without an outer housing. Some of the springs and gear train of the lifter S/A 70 are visible in this view.

Referring now to FIG. 8, the chassis S/A 40 is depicted in an exploded view. Along with the end cap 50, the chassis S/A 40 seals and contains the pressurized gas while the tool is in operation on a jobsite. At the bottom (in this view) of the chassis S/A 40 is a chassis 34 for mounting the gearbox housing 32. Directly above the chassis 34 is a pinion gear opening 87 for the pinion gear 47. A plurality of fasteners 96 secures a bearing block 98 proximal to the pinion gear opening 87.

Directly above the pinion gear opening 87 is a middle, annular seal seat 101. On the left side (in this view) of the seat 101 is a left seal seat 103, and on the right side (in this view) is a right seal seat 105. The left seal seat 103 exhibits an upper corner 111 and a lower corner 113. The right seal seat 105 exhibits an upper corner 115 and a lower corner 117. In the center of the seat 101 is a driver opening 88.

The chassis S/A 40 exhibits a left-side pressure chamber cap 82, a right-side pressure chamber cap 84, and a cylinder chamber cap 81. These three caps 81, 82, and 84, along with the tri-chamber seal 80 (also sometimes referred to herein as a "lower seal") act to seal the cylinder chamber 56, the left-side pressure chamber 42, and the right-side pressure chamber 44. The end cap 50 and the chassis S/A 40 are at opposite ends of the pressurized gas system of the tool 10.

The lower seal 80 exhibits the central O-ring portion 100, a left seal portion 102, and a right seal portion 104. The left seal portion 102 and the right seal portion 104 are also sometimes referred to herein as "ear-shaped" portions. The left seal portion 102 has an upper corner 110, and a lower corner 112. The right seal portion 104 has an upper corner 114, and a lower corner 116.

The lower seal 80 seats into the plurality of seats discussed above. The central portion 100 is designed to sit in the seat 101. The left seal portion 102 is designed to sit in the left seal seat 103, the upper corner 110 sits in the upper corner 111, and the lower corner 112 sits in the lower corner 113. The right seal portion 104 is designed to sit in the right seal seat 105, the upper corner 114 sits in the upper corner 115, and the lower corner 116 sits in the lower corner 117.

A seating portion of a power transmission subassembly ("S/A") 90 is located on the opposite side of the chassis S/A 40 from the lower seal 80. The power transmission S/A 90 includes a lifter bearing opening 95, a lower solenoid opening 94, and a drive spur gear bearing opening 92. The entire lower power transmission S/A 90 is part of the chassis S/A 40, which is securely attached to the tool 10, via a plurality of fasteners 97 that hold the guide body to the chassis S/A 40.

Figure 9:
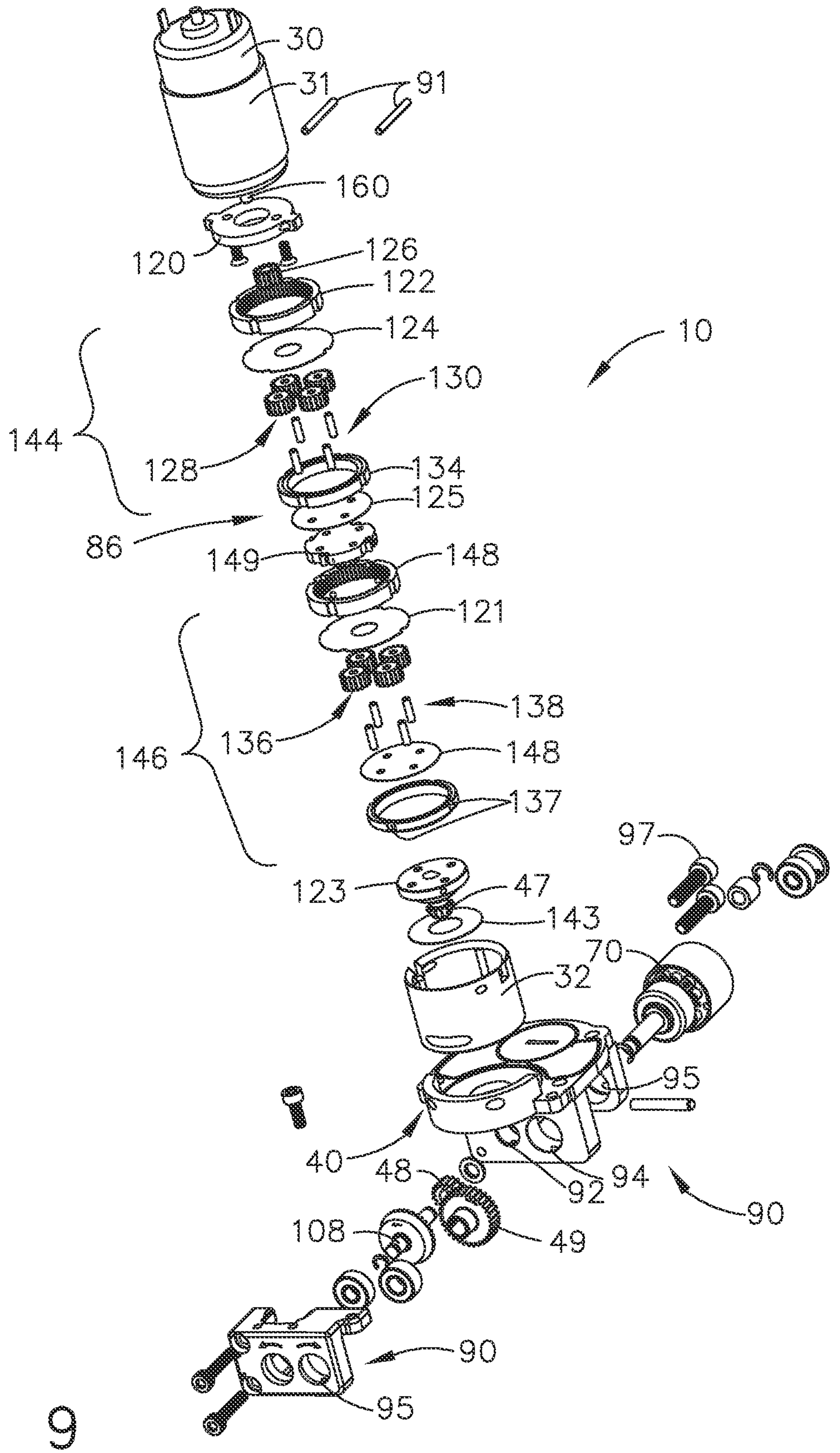
FIG. 9 is an exploded view of the major components of the mechanical power train between the motor and the lifter, including the motor, gearbox, front seal seat subassembly, and lifter subassembly of the fastener driving tool of FIG. 1.

Referring now to FIG. 9, the lifter S/A 70, the chassis S/A 40, the gear train S/A 86, the power transmission S/A 90, and the motor 30 are depicted in an exploded view. In FIG. 9, a plurality of locating pins 91 are shown, along with a bevel gear 108 that is mechanically connected to the drive spur gear 48. A cover 109 covers the bevel gear 108 and the spur gear 48. The lifter shaft 79 exhibits a key portion 73, and extends through a solenoid 75. The solenoid 75 is proximal to the driven spur gear 49.

The gear train S/A 86 includes a mounting adapter 120 that mechanically connects to the motor 30. The mounting adapter 120 is part of a first gear set subassembly ("S/A") 144. The first gear set S/A 144 includes the mounting adapter 120, a first ring gear 122, a first separation plate 124, a pinion 126, a first planetary gear set 128, a first set of planet shafts 130, a first spacer/ring 127, a second separation plate 125, a first output disk 145, and a spur gear 149 (that is integral with the disk 145). It should be noted that the first ring 127 and the first output disk 145 are preferably configured to exhibit an "anti-reverse" function; i.e., the gear train S/A 86 can only rotate in one direction. (See the rolling pins on the first output disk 145, on FIGS. 23 and 24.)

A second gear set subassembly ("S/A") 146 is mechanically connected to the first gear set S/A 144. The second gear set S/A 146 includes a third separation plate 121, a second ring gear 134, a second planetary gear set 136, a second set of planet shafts 138, a fourth separation plate 123, a pair of spacer rings at 137, a second output disk 148, a deep groove 143 (sometimes referred to herein as a "deep groove ball bearing S/A"), and the pinion gear 47. The integral spur gear 149 of the stage 1 output disk 145 acts as a sun gear for the second gear set S/A 146.

Figure 23:
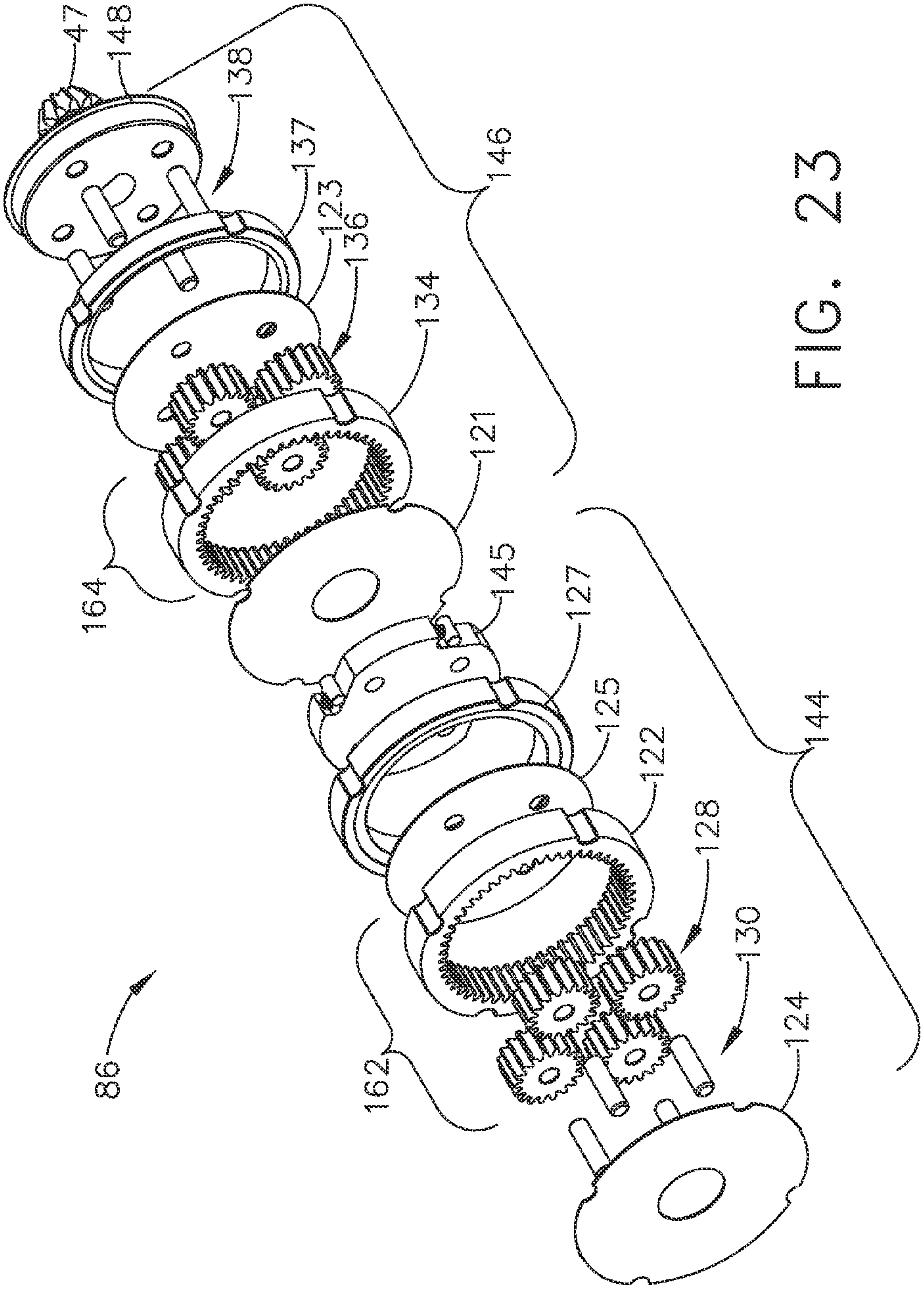
FIG. 23 is an exploded view of the gear train subassembly of the fastener driving tool of FIG. 1.
Figure 24:
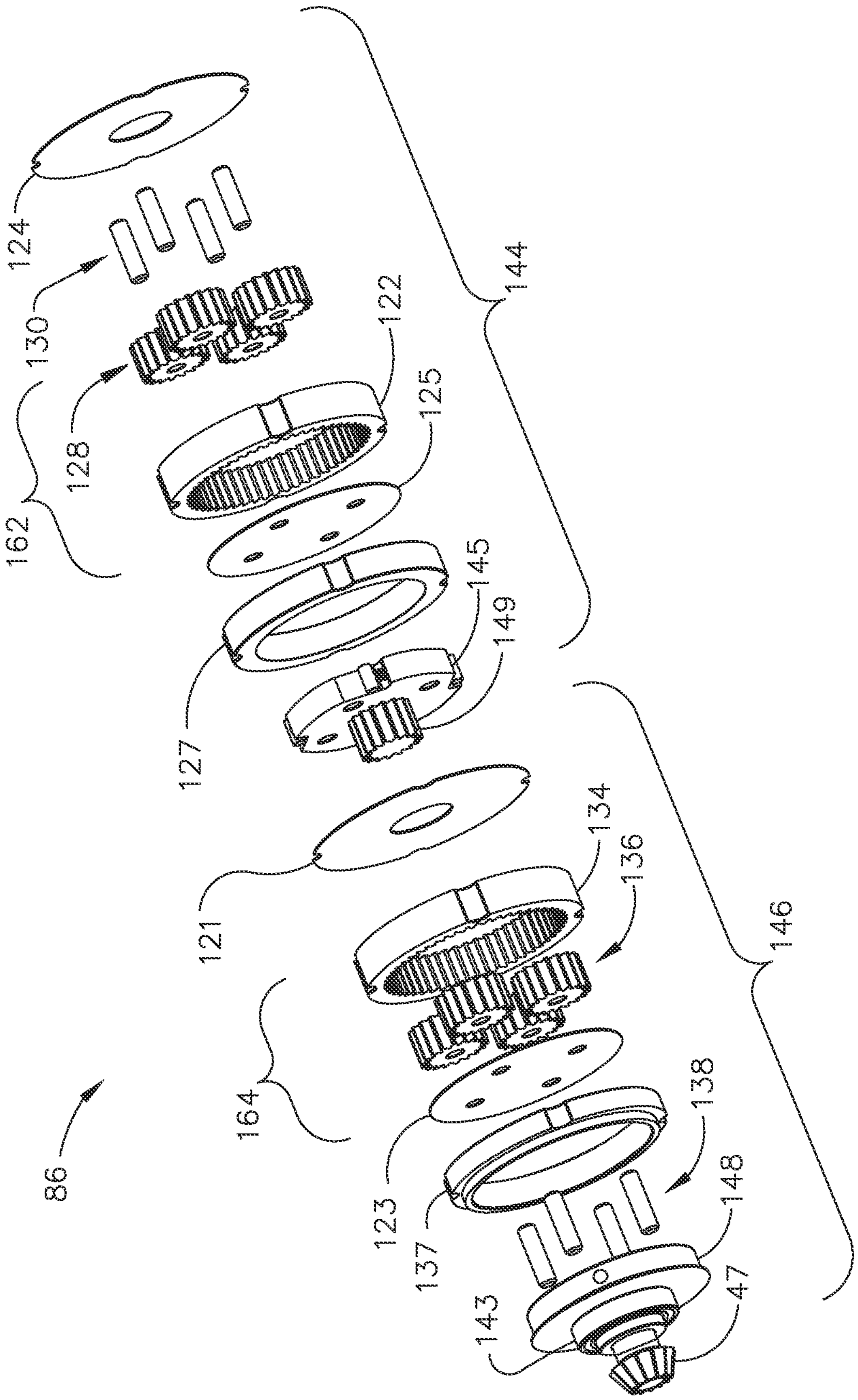
FIG. 24 is an exploded view of the gear train subassembly, in an opposite perspective of FIG. 23.

It should be noted that in FIG. 9, the second spacer 137 is depicted has a plurality of rings, whereas in FIGS. 23 and 24, the second spacer 137 is depicted as a single ring. It will be understood that the number of spacers in the gear train S/A 86 can be variable, depending on the wishes of the system designer.

In FIG. 9, the motor 30 exhibits an output pinion 126, which is mechanically attached (press fit) to the pinion a shaft 160. The pinion 126 engages the planetary gears 128 of first gear set S/A 144, thus driving the entire gear train S/A 86. Pinion gear 126 acts as the sun gear of the first gear set S/A 144. The second gear set S/A 146 mechanically attaches to the power transmission S/A 90 via the shaft with pinion gear 47, thereby driving the lifter S/A 70 mounted in the power transmission S/A 90.

Figure 10:
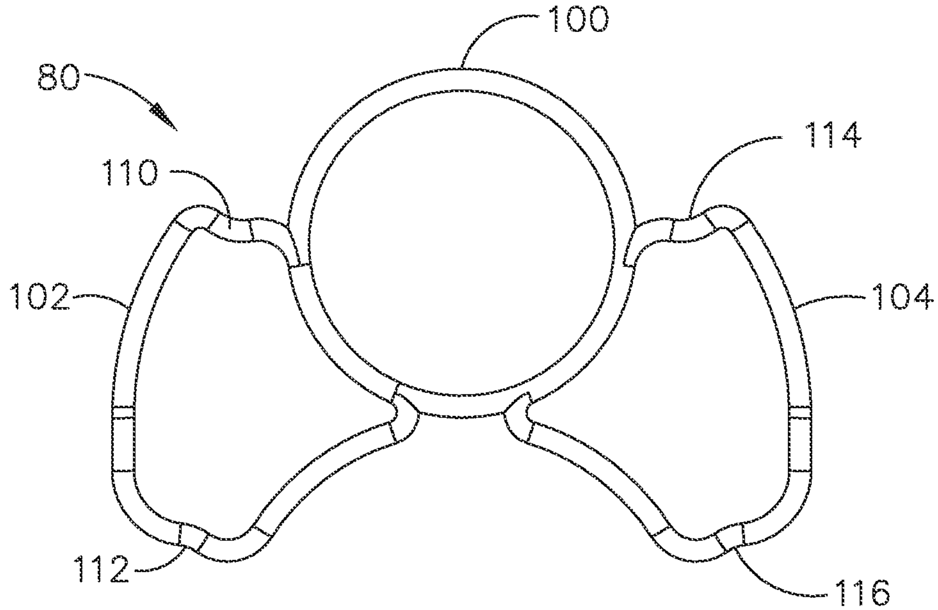
FIG. 10 is an enlarged view of the front seal of the fastener driving tool of FIG. 1.

Referring now to FIG. 10, the tri-chamber seal 80 is shown in an enlarged view exhibiting the central O-ring portion 100 with its left and right "ear shaped" 102 and 104 portions. As can be seen in FIG. 10, the middle annular portion of the seal 80 is designed to keep the gas pressure inside the working cylinder 154, while the left and right portions 102 and 104 are designed to seal in the gas pressure in those corresponding pressurized gas chambers.

Figure 11:
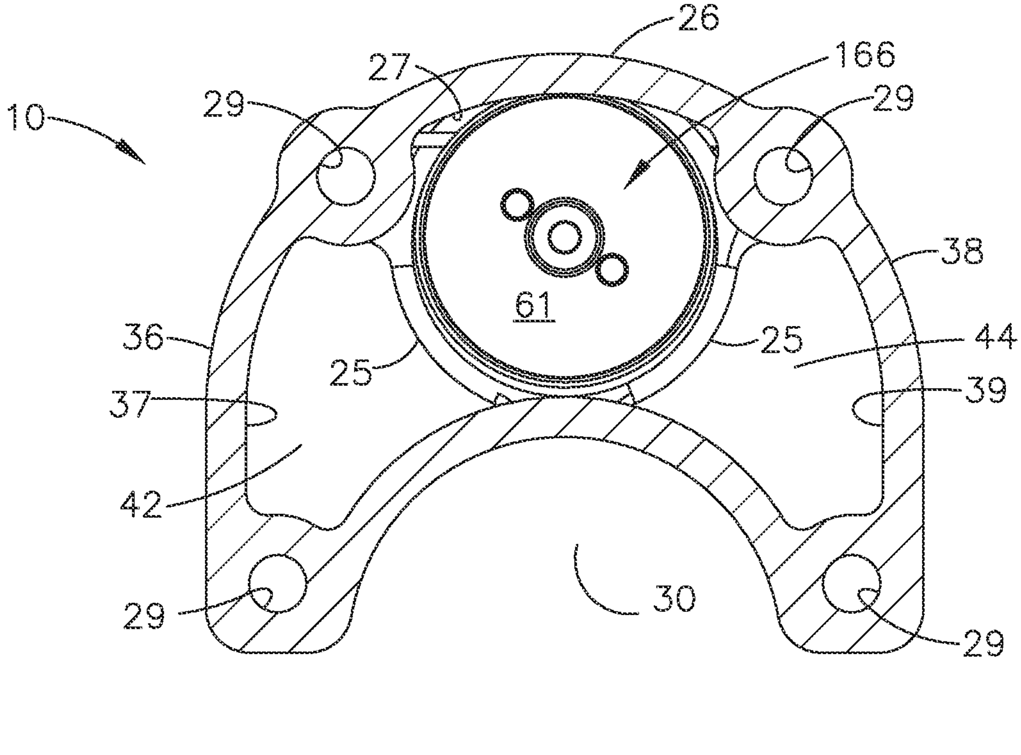
FIG. 11 is an enlarged cutaway view of a portion of the tool shown in FIG. 3.

Referring now to FIG. 11, a portion of the rear of the tool is depicted in an enlarged rear cutaway view along the section line 3-3 of FIG. 2. Note that the pressure chamber interior wall/cylinder sleeve 25 does not extend to contact the interior surface 51 of the end cap 50. As discussed above, this feature allows the pressurized gas to fill the volume referred to as the main pressure storage chamber 156.

Figure 12:
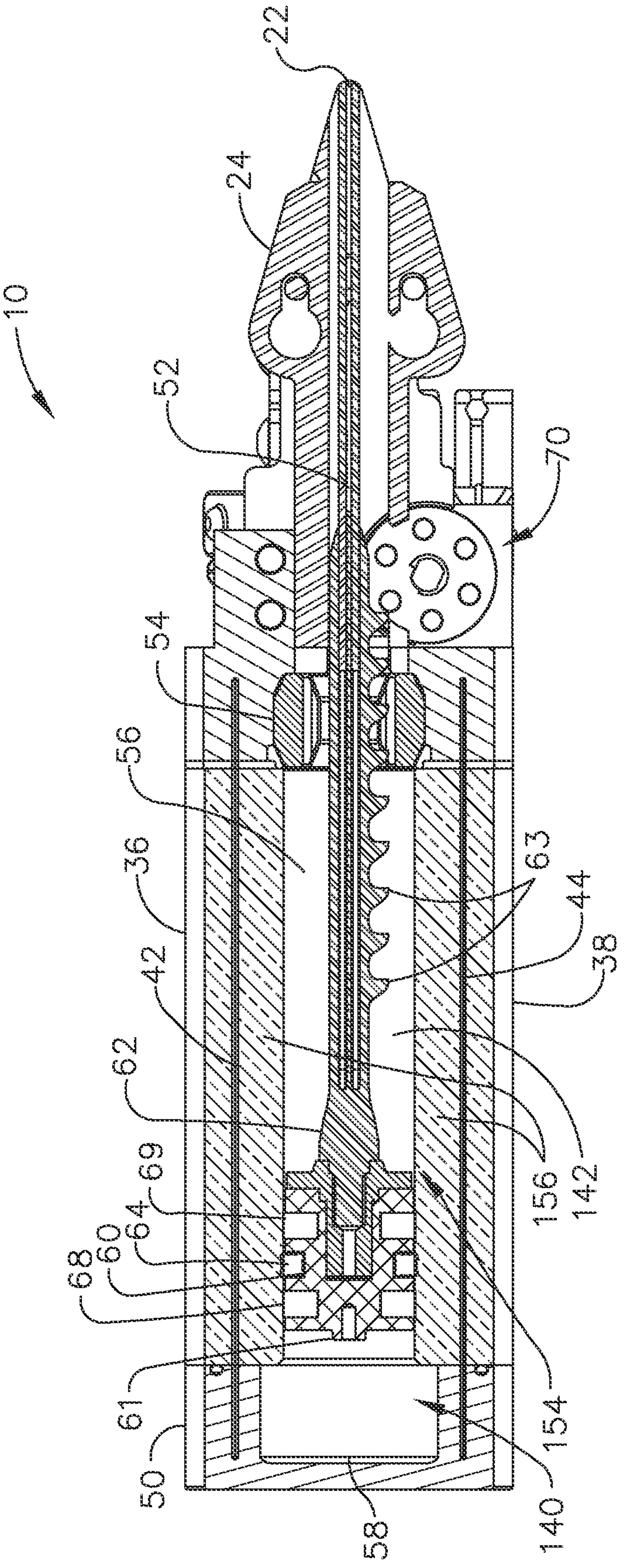
FIG. 12 is a top cutaway view along the section line 12-12 of FIG. 3 of the fastener driving tool of FIG. 1

Referring now to FIG. 12, the piston 60 is depicted at its ready position. Note that, if the piston 60 was moved to its the driven position, the driver teeth 63 can be contacted sequentially by the lifter pins 72 to raise the driver 62 and the piston 90 back to the ready position.

Figure 13:
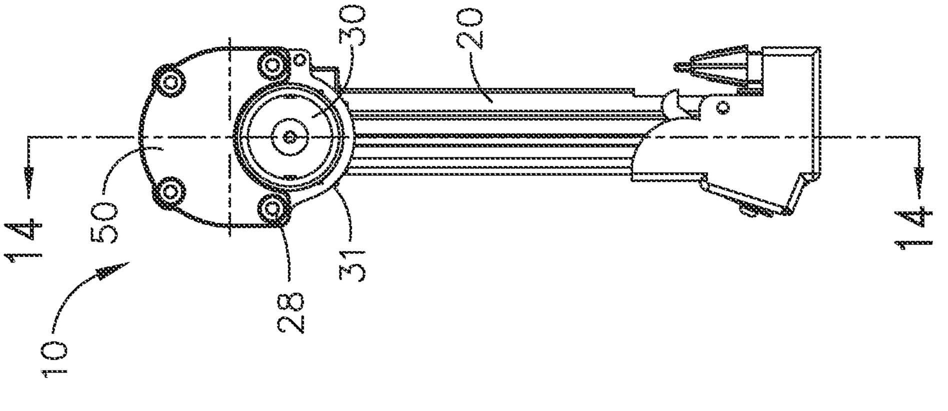
FIG. 13 is a rear elevational view of the fastener driving tool of FIG. 1.

Referring now to FIG. 13, a rear view of the tool 10 is depicted. This view, again, shows the inverted U-shape of the pressure chamber, of which the end cap 50 is a portion of.

Figure 14:
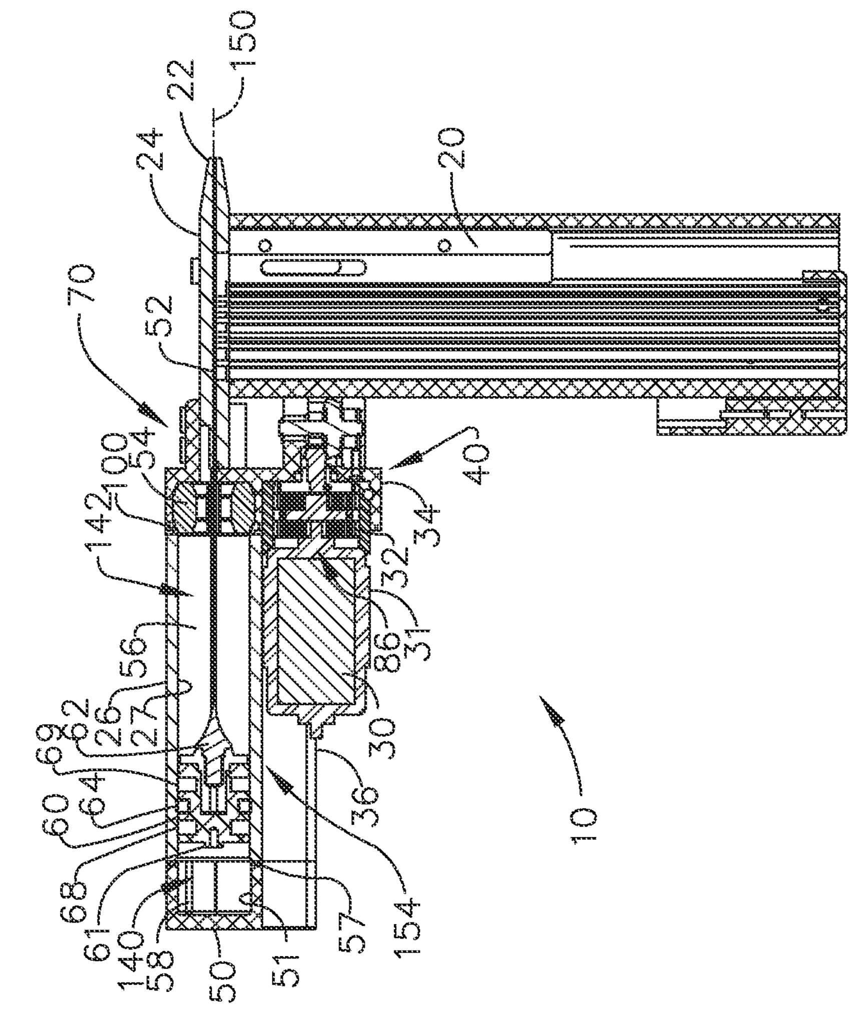
FIG. 14 is a right side cutaway view along the section line 14-14 of FIG. 13.

Referring now to FIG. 14, a right side cutaway view along the section line 14-14 of FIG. 13 is depicted. A portion of the mechanical drive components are illustrated from the opposite side as shown in FIG. 5.

Figure 15:
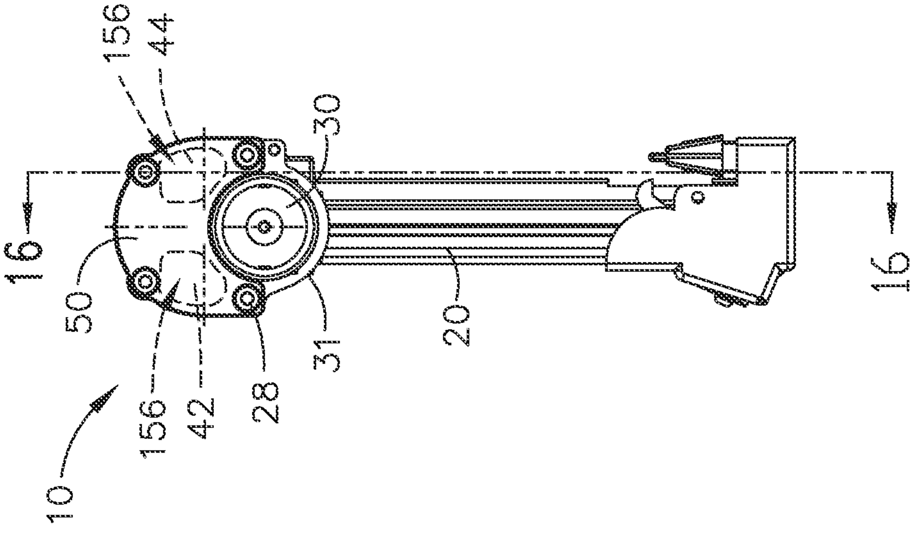
FIG. 15 is a rear elevational view of the fastener driving tool of FIG. 1, with dashed lines highlighting the left-side and right-side pressure chambers.

Referring now to FIG. 15, a rear view of the tool is depicted showing the r and right-side pressure chambers 42 and 44, respectively, in dashed lines. It will be understood that the exact sizes and shapes of the pressure chambers 42 and 44 may be altered without departing from the principles of the technology disclosed herein. And, for example, the overall "U-shape" of the overall pressure chamber depicted in the illustrated embodiment is only one desirable shape that could be achieved with this equipment.

In other words, other overall shapes, could instead be constructed for the pressure chamber, in which the lifter motor could be at least partially 'nested' in a pressure chamber having a different overall shape. For example, the pressure chamber could have an overall "J-shape," and the lifter motor could be at least partially nested in the 'crook' part of that J-shape, thereby still providing a compact overall cross-section profile for the tool. As a further example, the pressure chamber could have something like an overall “H-shape,” in which the lifter motor would be at least partially nested in one portion between the ‘bottom legs’ of the H-shape, while the working cylinder perhaps could be nested in a second portion between the ‘top legs’ of the H-shape. Many different specific shapes are possible, while still ‘nesting’ the lifter motor within a portion of the overall pressure chamber shape.

Figure 16:
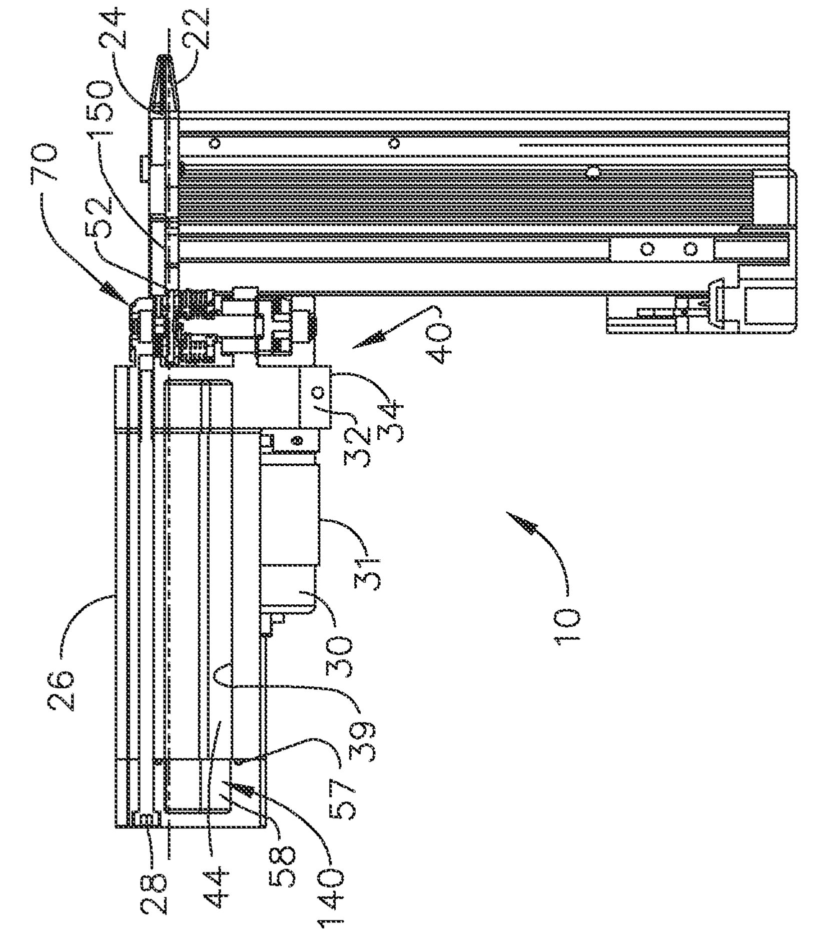
FIG. 16 is a right side cutaway view along the section line 16-16 of FIG. 15.

Referring now to FIG. 16, a right side cutaway view along the section line 16-16 of FIG. 15 is depicted. In this view, the right-side pressure chamber 44 is shown. Note that one of the fasteners 28 is depicted fully secured in the chassis S/A 40, which holds the end cap 50 onto the outer walls 26, 36, and 38. In FIGS. 15 and 16, it can be seen that a portion of the pressure chamber 44 is fully to the side of the working cylinder 154. In this embodiment, the opposite side pressure chamber 42 is essentially symmetrical with the pressure chamber 44, and thus exhibits the same size and shape characteristics.

Figure 17:
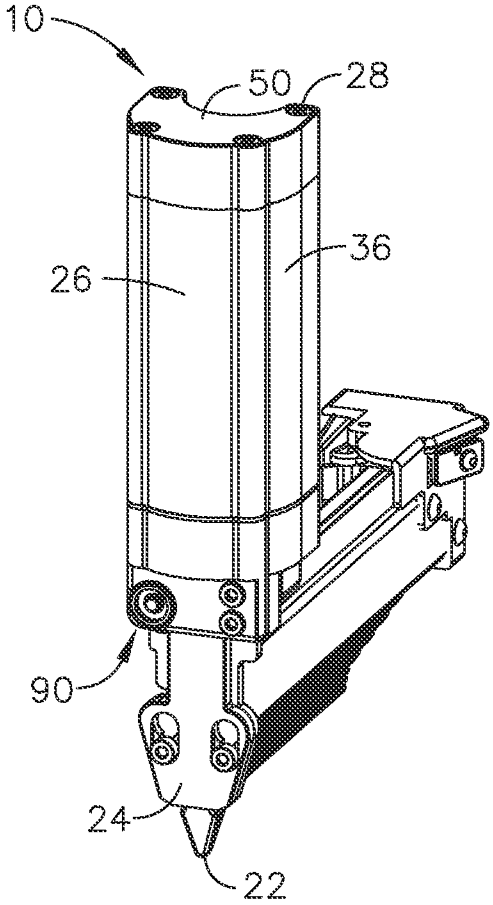
FIG. 17 is a top, front, left side perspective view of the fastener driving tool of FIG. 1.

Referring now to FIG. 17, a front perspective view of the tool 10 is illustrated. This view illustrates the entire length of the pressure chamber and working cylinder, the guide body 24, and also shows the mounting portion of the power transmission S/A 90. The end cap 50 is shown, including its overall U-shaped profile.

Figure 18:
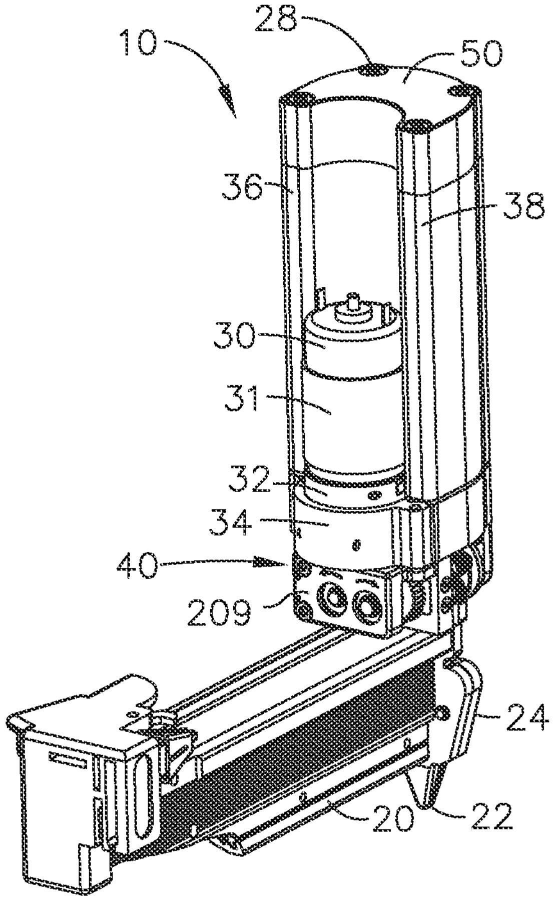
FIG. 18 is a top, rear, right side perspective view of the fastener driving tool of FIG. 1.

Referring now to FIG. 18, a rear perspective view of the tool 10 is illustrated. This view illustrates the overall length of the working cylinder and pressure chamber, and the motor and outer portions of the power train. In particular, this view shows the overall U-shape of the end cap 50 and how that shape matches the overall shape of the pressure chamber, with the motor 30 “tucked away” inside the outer portions of the pressure chamber. Furthermore, an alternative cover 209 is illustrated, that is a portion of the power transmission S/A 90. FIG. 18 also clearly shows the bottom features of the magazine 20.

Figure 19:
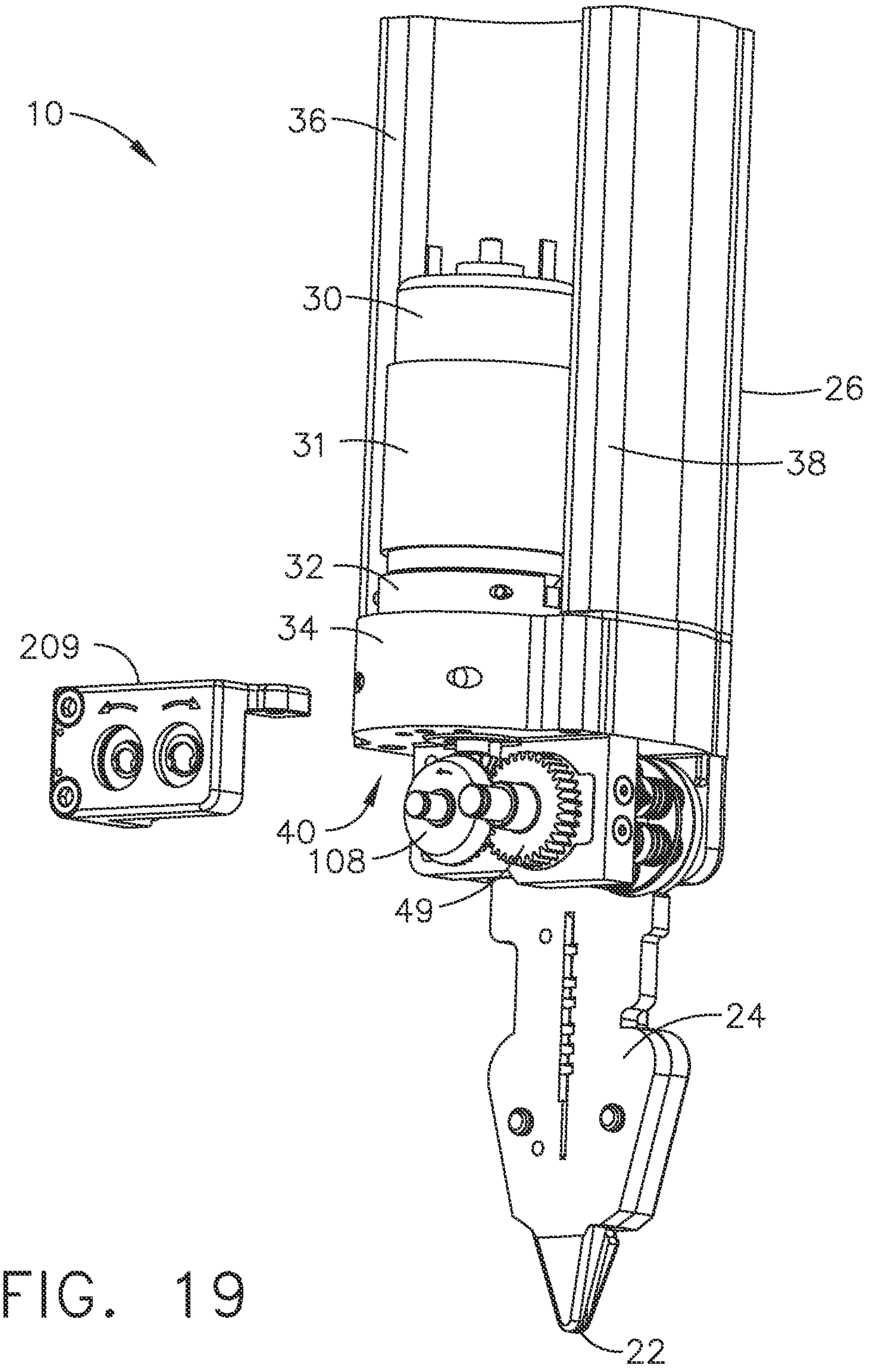
FIG. 19 is a partial exploded view of the chassis portion, of the fastener driving tool of FIG. 1.

Referring now to FIG. 19, the tool 10 is shown having the alternative cover 209. When emplaced in the tool 10, this cover 209 has openings to help hold the shafts for the drive spur gear 49 and the bevel gear 108 (which has an integral shaft).

Figure 20:
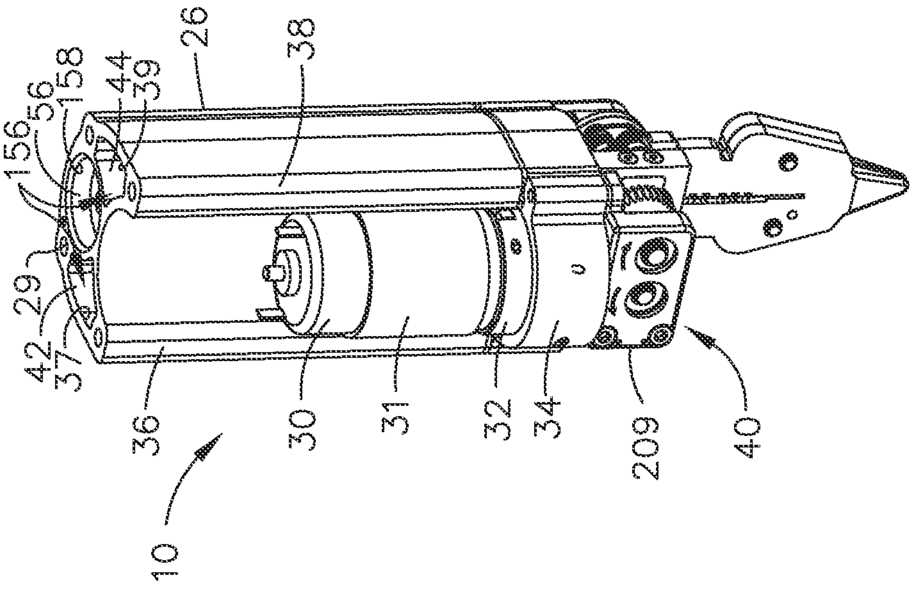
FIG. 20 is a top, rear, right side perspective view of the fastener driving tool of FIG. 1, with the end cap and magazine removed.

Referring now to FIG. 20, the tool 10 is shown with the alternative cover 209, and with the end cap 50 removed. The top of the cylinder 56 can be seen at reference numeral 158. This top portion 56 does not extend as far as the outer front wall 26, the left-side outer wall 36, or the right-side outer wall 38. The uppermost surface (in this view) of the pressure chamber will be covered with a seal 57 (see FIG. 22), to provide the air-tight attachment to the end cap 50.

Figure 21:
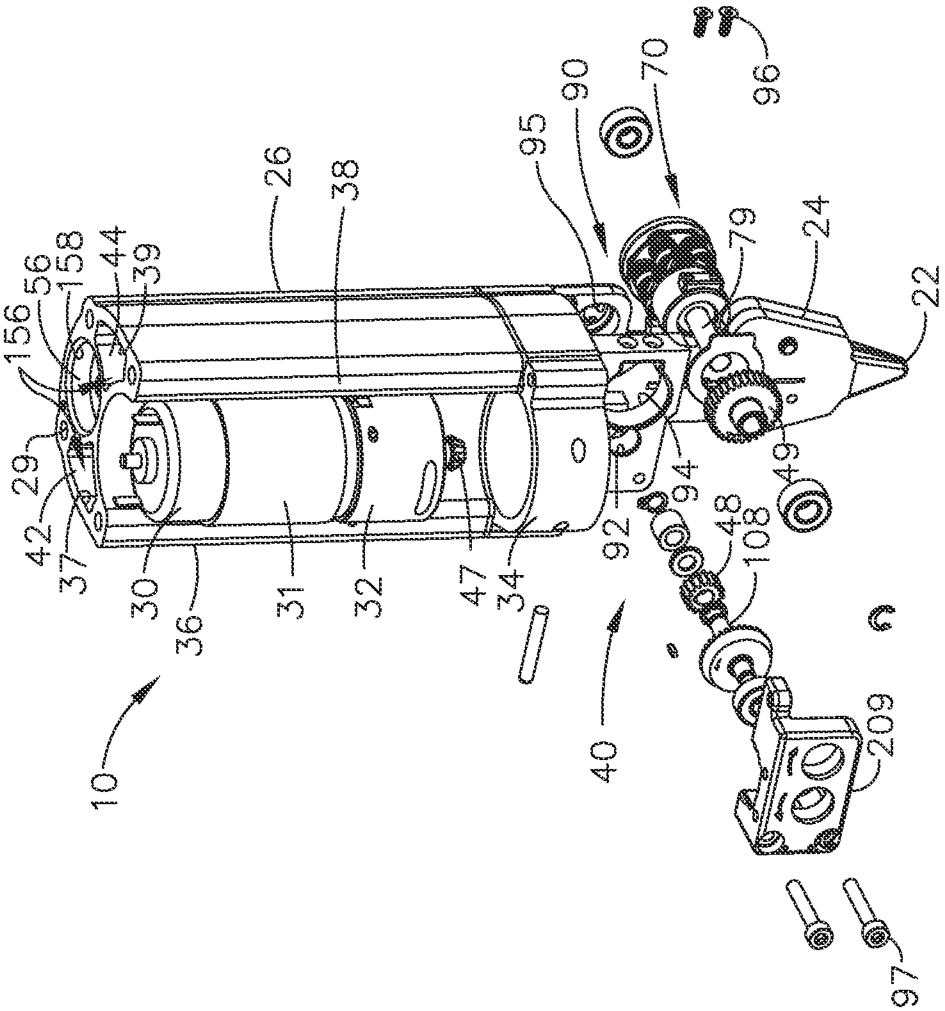
FIG. 21 is a partial exploded view of the power transmission subassembly, showing the same perspective as FIG. 20.

Referring now to FIG. 21, the tool 10 is shown with the alternative cover 209 and an exploded view of the power transmission S/A 90. Two different gear trains are illustrated in this view, in which the left-hand gear train (in this view) is driven by the motor and the right-hand gear train drives the lifter S/A 70. The left-hand gear train has an upper shaft (i.e., closest to the viewer of this drawing) that extends through the left large opening in the cover 209, while the right-hand gear train’s lifter shaft 78 extends through the right large opening in the cover 209. When fully assembled, as discussed below, the drive gear 48 drives the driven gear 49.

Figure 22:
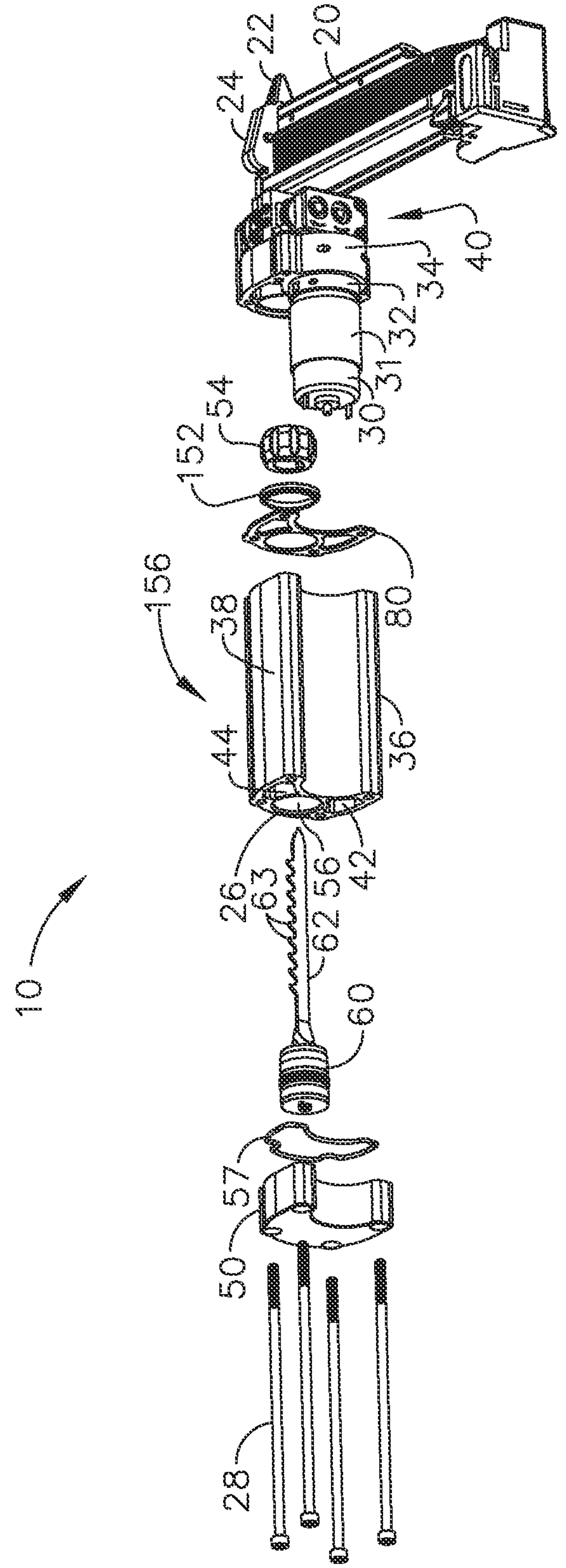
FIG. 22 is an exploded view of some of the major components of the fastener driving tool of FIG. 1.

Referring now to FIG. 22, the tool 10 is shown in an exploded view. An additional special piston stop retaining ring 152 is positioned between the lower seal 80 and the piston stop 54 in this embodiment. The top seal 57 is illustrated, which seals the junction between the end cap 50 and main pressure storage chamber 156. The pressure chamber seal 57 is located proximal to the second end, and exhibits an inverted U-shape. The “U-shape” configuration of the right and left pressure chamber outer walls 38 and 36 is visible in FIG. 22. This “U-shaped” assembly fits above and around the motor 30 and the motor housing 31, and is secured into the chassis S/A 40 by the fasteners 28. Note that the rather long fasteners 28 extend through the end cap 50, the top seal 57, entirely through the main storage pressure chamber 156, the bottom seal 80, and secure into the chassis S/A 40.

Referring now to FIG. 23, a rear exploded view of the gear train S/A 86 is depicted. The motor 30 mechanically attaches to the first gear set S/A 144, and the second gear set S/A 146 mechanically attaches to the first gear set S/A 144, and thereby outputs to the power transmission 90 via the pinion gear 47. The operation of these components is described below in greater detail. The first gear set S/A 144 includes a first planetary gear set 162 includes a first ring gear 122, four planet gears 128, which are mounted to locating pins or shafts 130. The sun gear for this first planetary gear set is not shown in this view. The second gear set S/A 146 includes a second planetary gear set 164 which includes a second ring gear 134, four planet gears 136, and locating pins or shafts 138.

Referring now to FIG. 24, a front exploded view of the gear train S/A 86 is depicted. The motor 30 spins at a relatively high speed, such as 19,100 RPM (revolutions per minute), for example. The gear train S/A 86 reduces that speed and increases the torque in order to operate the lifter S/A 70.

In operation, the motor 30 is actuated which begins rotating the output pinion 160 (at around 19,100 RPM, for example). The output pinion 160 inserts into the first gear set S/A 144 and engages with the first planet gears 128. The first planet gears 128 transfers the load to the first ring gear 122; this configuration is sometimes referred to as a first planetary gear assembly 162. The first gear set S/A 144 reduction calculation is the number of teeth on the first ring gear 122 divided by the number of teeth on the “sun gear” (i.e., the output pinion 160) plus one. So if the number of teeth on the first ring gear 122 equals 52, for example, and the number of teeth on the output pinion 160 equals 16, for example, the reduction calculation is 52 divided by 16 plus 1, or about 4.25:1.

Next, the second gear set S/A 146 engages with the first gear set S/A 144, and the second planet gears 136 transfers the load to the second ring gear 134; this configuration is sometimes referred to as a second planetary gear assembly 164. The reduction calculation is the same as above; however, the “sun gear” in the second gear set S/A 146 is the combination of the first output disk 145 connected to the spur gear 149. Using the same numbers as above, for example, the reduction calculation of the second gear set S/A 146 is again about 4.25:1. In the second planetary gear assembly 164 includes the sun gear (i.e., the spur gear 149), the second planet gears 136, and the second ring gear 134. At this stage, the two reductions are multiplied; i.e., 4.25 times 4.25 which equals 18.0625:1 reduction thus far into the gear train S/A 86.

Then the pinion gear 47 outputs to the bevel gear with integral shaft 108. These two gears 47 and 108 create another reduction, and that reduction calculation is as follows: where the pinon gear 47 has 13 teeth, for example, and the bevel gear with shaft 108 has 32 teeth, for example, which equals a ratio of 2.462:1. Again, multiplying the result along with the total accumulated reduction ratio equals 44.47:1.

The bevel gear with integral shaft 108 is keyed with the drive spur gear 48, and the drive spur gear 48 mechanically mates with the driven spur gear 49 on the lifter shaft 79. Dividing the number of teeth of the driven spur gear 49 by the drive spur gear 48, where the drive spur gear 48 has 16 teeth, for example, and the driven spur gear 49 has 32 teeth, for example, equals a ratio of about 2:1. Combining this reduction ratio to the previous totaled reduction ratio equals a final total reduction ratio of about 89:1; or about 215 RPM during a lift stroke, for example.

It will be understood that the precise number of gear teeth on each portion of the gear train S/A 86 and the lifter S/A 70 are decisions to be made by the system designer. The number of gear teeth used depend on what power and torque are needed between the output of the motor 30 and the rotation of the lifter S/A 70, as determined by the designer. In the examples given above, the reduction ratio is quite pronounced due to the fact that the lifter S/A 70 has to overcome the force of the pressurized gas stored in the main pressure storage chamber 156. It will also be understood that the force needed to overcome a tool's driving mechanism differs from one type of tool to a different type of tool.

It will be understood that the lifter motor and any sensors used in this tool will communicate with a system controller (not shown). A printed circuit board that contains the system controller, and can be placed within a handle portion (not shown). In a typical fastener driving tool, a trigger switch is activated by a trigger actuator. In such tools, the handle portion is designed for gripping by a human hand, and the trigger actuator is designed for linear actuation by a person's finger while gripping the handle portion. The trigger switch typically provides an input to the control system. In FUSION-type tools, there are certain types of sensors and output indicators, and those types of input and output devices will likely be used in this present tool design.

The system controller will typically include a microprocessor or a microcomputer device that acts as a processing circuit. At least one memory circuit will also typically be part of the system controller, including Random Access Memory (RAM) and Read Only Memory (ROM) devices. To store user-inputted information (if applicable for a particular tool model), a non-volatile memory device would typically be included, such as EEPROM, NVRAM, or a Flash memory device.

Operation of Tool

The "ready position" of the tool 10 is when the piston 60 is proximal to the end cap 50 (see FIG. 5). The "driven position" of the tool is when the piston 60 is distal from the end cap 50, and is proximal to the piston stop 54. The tool engages in a "drive stroke" when the piston 60 is released from the lifter S/A 70, at which time the gas pressure will force the piston 60 to move toward the driven position.

A drive stroke typically occurs when the trigger is engaged by a human user, and the exit end 22 is pressed against a workpiece. Virtually every fastener driving tool in commercial use includes a safety contact element that is actuated when the exit end of the tool is pressed against a workpiece. When the trigger is pulled, the lifter S/A 70 rotates, thereby releasing the driver 62 from making contact with the lifter; then the force of the compressed gas in the end cap 50 and the left and right-side pressure chambers 42 and 44 force the piston 60 and the driver 62 towards the exit end 22. A fastener from the fastener magazine 20 is forced through the guide body 24 and out of the exit end 22 by the driver 62.

The pressure of the gas in the end cap 50, the left-side pressure chamber 42, the right-side pressure chamber 44 (i.e., the entire pressure chamber 156) is sufficiently high to quickly force the driver 62 downward so as to properly seat a fastener into a substrate.

As the driver 62 is being moved downward, the piston 60 and the piston stop 54 are forcing air (or possibly some other gas) out of the variable venting volume 142 that is below the piston 60. This volume of air is moved through a vent to atmosphere (not shown), and it is desired that this be a low resistance passageway, so as to not further impede the movement of the piston 60 and driver 62 during their downward stroke. The pressurized gas above the piston 60 is not vented to atmosphere, but instead remains within the combination of the pressure chamber 156 and the variable displacement volume 140.

One aspect of the present invention is to provide a rather large storage space volume to hold the pressurized gas that is also used to drive the piston 60 downward during a driving stroke of the driver 62. The interior volume of the end cap 50 is a completely open space, which is in communication with the left-side pressure chamber 42 and the right-side pressure chamber 44. It is preferred that the volume of the end cap 50 and the left-side and right-side storage chambers 42 and 44 be larger than the total volume of the cylinder working spaces. This will allow for a powerful and quick stroke.

At this stage, the lifter S/A 70 is engaged in order to "lift" the driver 62 and piston 60 back to a ready position (via a "return stroke"). The motor 30 is energized, which mechanically rotates the gear train S/A 86, the pinion gear 47, the bevel gear 108, the drive spur gear 48, and the driven spur gear 49. Once the driven spur gear 49 begins to rotate, the lifter shaft 79 also begins to rotate. The lifter base 74 and the lifter cover plate 76 are in mechanical communication with, and rotate concurrently with, the lifter shaft 79, which in turn rotates the lifter pins 72. The lifter pins 72 mechanically engage the driver teeth 63 one at a time as the lifter shaft 79 rotates during the return stroke. Each individual lifter pin 72 engages a single driver protrusion 63 until the driver 62 is completely "lifted" back to the ready position.

The illustrated embodiment allows for both a quick firing (or driving) stroke time and also a fairly quick "lifting" time to bring the driver 62 back to its upper position, ready for the next firing (driving) stroke. Both of these pneumatic and mechanical actions can sequentially occur quickly and allow a user to quickly place fasteners into a surface, perhaps as fast as two operational cycles per second.

The working pressure in the system could preferably be around 120 PSIG, and should probably be at least 100 PSIG for a quick-firing tool. By the term "working pressure" the inventors are referring to the pressure in the end cap 50 and the left-side and the right-side pressure chambers 42 and 44 at the time the piston 60 is at its ready position, which is when it is at (or proximal to) its uppermost travel position.

It should be noted that other gases besides air can be used for the main pressure storage chamber 156 and the variable displacement volume 140, if desired. While dry and clean air will work fine in many or most applications, alternative gases could be used as the "charge gas," such as nitrogen gas. In fact, bottled nitrogen gas is preferred.

Figure 25:
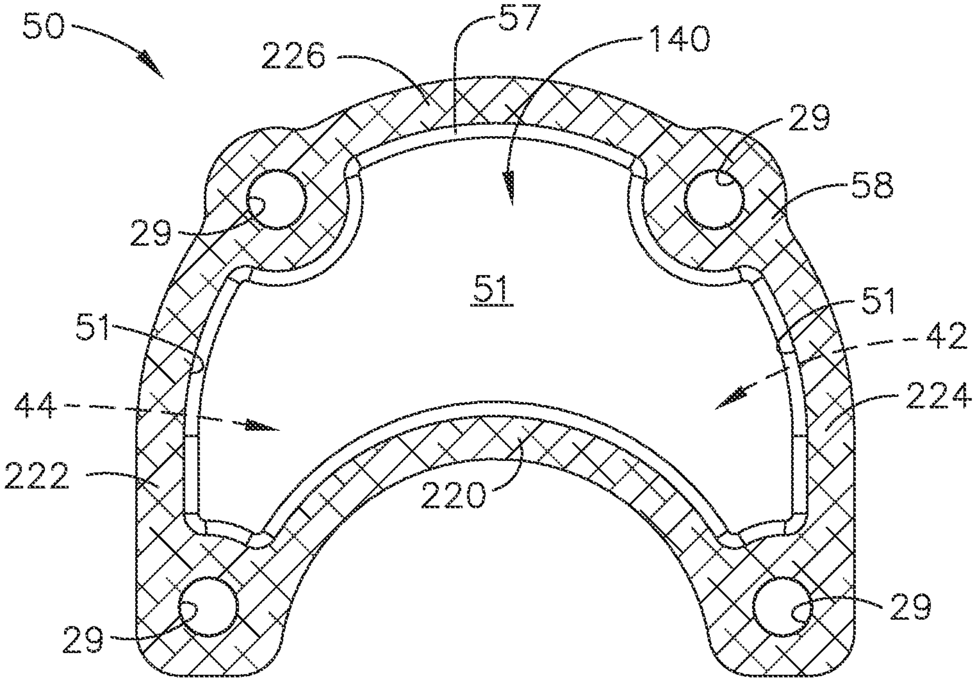
FIG. 25, is a cutaway view of the end cap along the section line 25-25 of FIG. 2.

Referring now to FIG. 25, the interior of the end cap 50 is illustrated as a cutaway view along section line 25-25 of FIG. 2. The interior surface 51 creates an open space, which is bounded by a bottom wall 220, a top wall 226, a left wall 224, and a right wall 222. These four "boundaries" of the interior surface 51 comprise the end cap volume 140. The end cap volume 140 is in fluidic communication with the right-side and left-side pressure chambers 42 and 44 which reach the end cap at the areas designated by the arrows 42 and 44 on FIG. 25.

Figure 26:
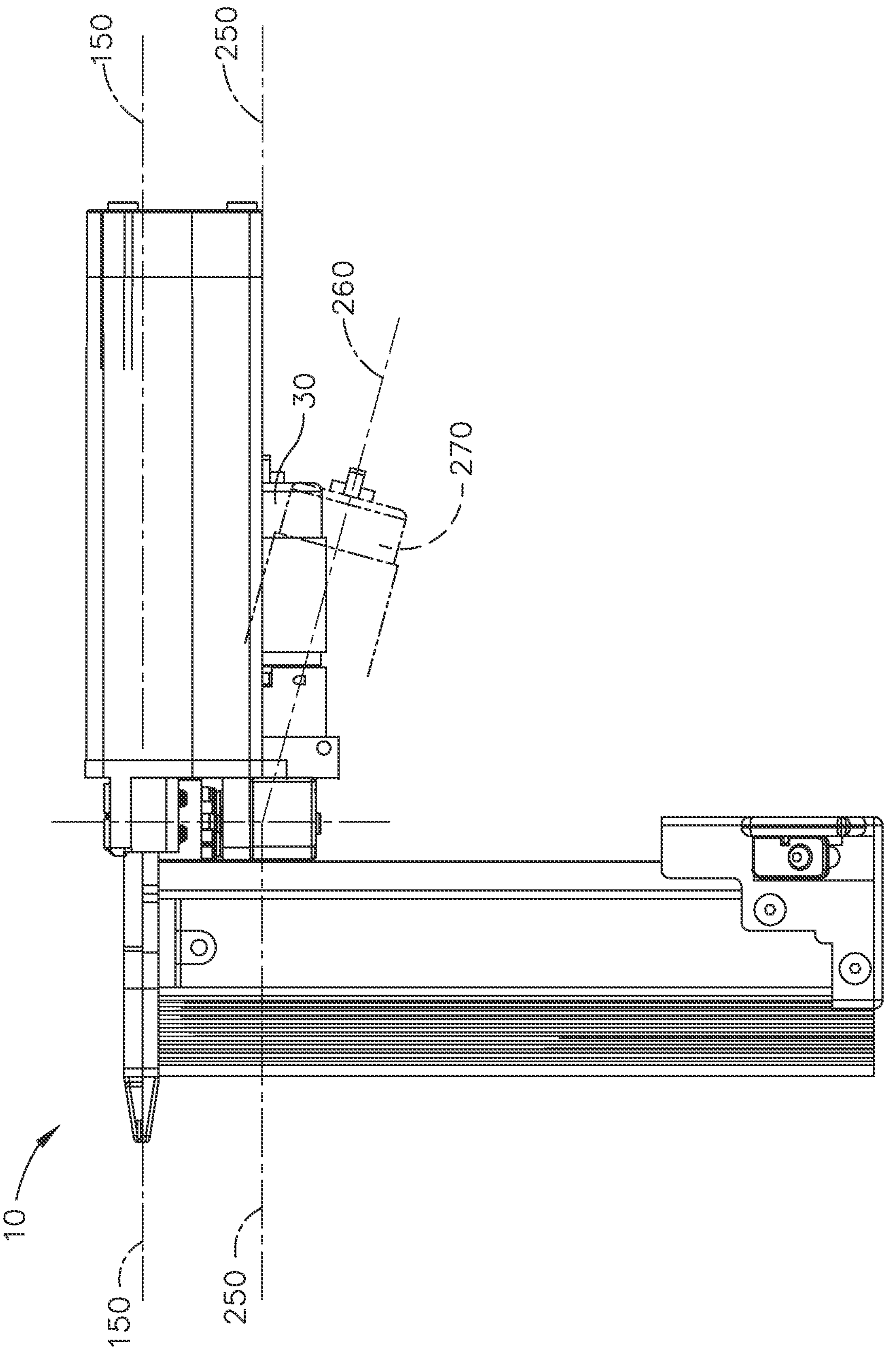
FIG. 26 is a left side elevational view of the fastener driving tool of FIG. 1, showing an alternative placement of the motor and gear train.

Referring now to FIG. 26, the longitudinal axis of the working cylinder is depicted at the reference numeral 150, as noted above. (This axis 150 will sometimes be referred to herein as the "first longitudinal axis.") In this view, the longitudinal axis of the motor 30 is also depicted, at the reference numeral 250. This "second longitudinal axis" 250 extends along the centerline of the rotating portion of the motor 30, and is substantially parallel to the first longitudinal axis 150. It will be understood that the centerline of the rotating portion of the motor 30 defines the second longitudinal axis 250. It will also be understood that the motor's 30 rotating output portion drives a geartrain, in which the geartrain's rotating output portion may also define the second longitudinal axis 250. Furthermore, in this embodiment, the first longitudinal axis and the second longitudinal axis are co-planar.

As can be seen, with the motor 30 'tucked away' into the area of the U-shaped pressure chamber 156 (as clearly illustrated in FIGS. 13, 15, and 18, for example), these two longitudinal axes are substantially parallel to one another. This provides for a very compact fastener driving tool and, as compared to conventional FUSION-style tools, provides more room for a human user's hands when operating the tool, and provides for a smaller cross-section area, near the front portion of the tool, which allows for more 'open' space in tight work spaces such as cabinetry or other similar locations. As noted above, conventional FUSION-style tools have a lifter motor longitudinal axis that is perpendicular to the working cylinder longitudinal axis, which limits the profile of the tool on its sides near the front of the tool, which becomes a greater working space issue when the motor housing is somewhat offset to the side of the main centerline of the tool.

Alternative Configurations

FIG. 26 also illustrates a possible alternative position for the motor and mechanical drivetrain, if desired. In this view, the alternative motor is depicted in dashed lines, at the reference numeral 270. If the longitudinal axis of the motor 270 is angled at about 15 degrees 'tilt' as compared to the longitudinal axis 250, that will produce a tool that has the approximate appearance as illustrated by these dashed lines for the motor position, and the longitudinal axis for this alternative position motor 270 is depicted at the reference numeral 260. Therefore, the approximate angle between the line 250 and line 260 is about 15 degrees. And, it should be noted that the plane of the tilt angle does not necessarily need to be in the vertical direction (as it was illustrated in FIG. 26).

One reason to design a tool with a tilt angle of other than zero degrees could be to perhaps provide more room to allow for more cooling for the motor. Both the motor and the electronics (not shown) are heat sources when the fastener driving tool is in use, and providing more space between them may be necessary for a larger, more powerful tool, such as a framing nailer. Moreover, the battery pack (also not shown) is another heat source, especially when the tool is quickly used for many driving cycles in a short time period. Therefore, depending on the final design of all these heat-sourcing components, it may be desirable to 'tilt' the motor's "second" longitudinal axis, with respect to the working cylinder's "first" longitudinal axis 150.

Figure 27:
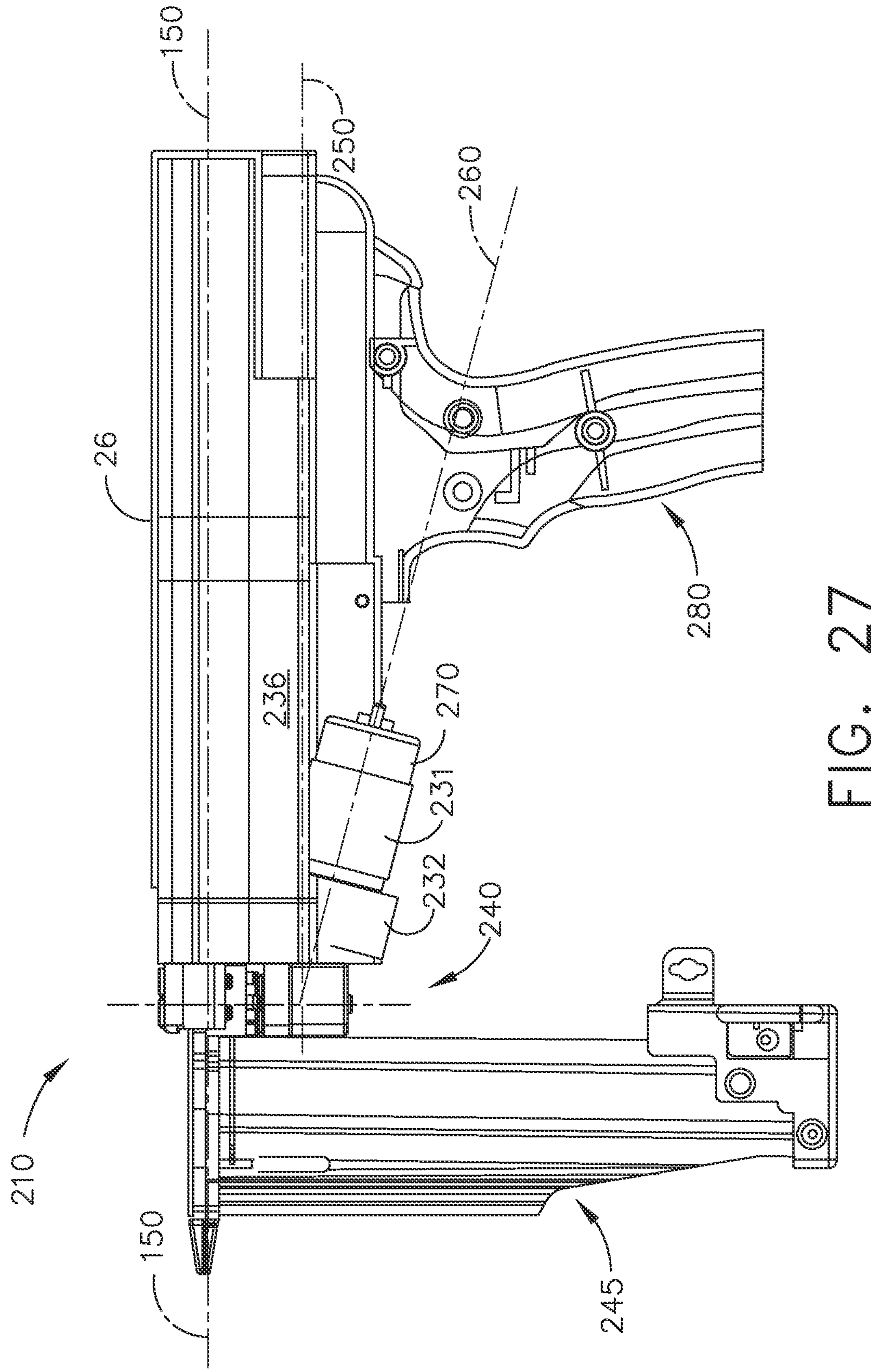
FIG. 27 is a left side elevational view of a fastener driving tool similar to that illustrated in FIG. 26, showing the same alternative placement of the motor and gear train, and with a slightly different right-side magazine and with a trigger handle.

Referring now to FIG. 27, a similar tool to that shown in FIG. 26 is illustrated, again with a tilt angle of about 15 degrees for the motor and mechanical drivetrain, as a possible alternative configuration. In FIG. 27, the overall tool is generally designated by the reference numeral 210, having an outer front wall 26 and a left-side pressure chamber outer wall 236 (essentially the same as in the first embodiment tool 10 of FIG. 1). This tool 210 includes a fastener magazine 245 that has a slightly different profile than the magazine 20 of the first embodiment tool 10, and it includes a trigger handle 280, which was not shown in the first embodiment drawings. However, the entire trigger handle is not shown on FIG. 27, including the bottom-most portion that typically would extend to a battery pack (also not shown). Furthermore, details of the actual movable trigger that would be installed on this type of tool are not illustrated, for purposes of clarity in the views of FIGS. 26-30.

It should also be noted that an outer housing for the entire tool is not illustrated in these views for purposes of clarity, but it would be typical for an outer housing to be included in a 'complete' tool. At least the high-temperature components, such as the motor, and the electronics that make up a system controller (not shown), would almost certainly need to be covered by an outer housing.

The tool 210 of FIG. 27 includes a motor 270 with a motor housing 231, and a gearbox with a housing 232. The output portion of the gearbox 232 angles into a lifter subassembly 240, which is similar to the lifter subassembly 70 of the first embodiment tool 10. At least one of the centerline of the rotating portion of the motor 270 and/or the centerline of the geartrain's rotating output portion defines a 'tilted' longitudinal axis 260, similar to that illustrated in FIG. 26.

The longitudinal axis of the working cylinder is depicted at the reference numeral 150, as noted above. (This axis 150 will sometimes be referred to herein as the "first longitudinal axis." The 'tilted' longitudinal axis 260 will sometimes be referred to herein as the "second longitudinal axis.")

As can be seen from viewing FIG. 27, the approximate angle between the line 250 and line 260 is about 15 degrees. And, as noted above, the plane of the tilt angle (between lines 250 and 260) does not necessarily need to be in the vertical direction. In other words, the motor 270 and its gearbox 232 could extend not only 'down' in this view of FIG. 27, but also somewhat off to the left side of the tool 210. In summary, the angle between the first and second longitudinal axes is about 15 degrees on FIG. 27.

Figure 28:
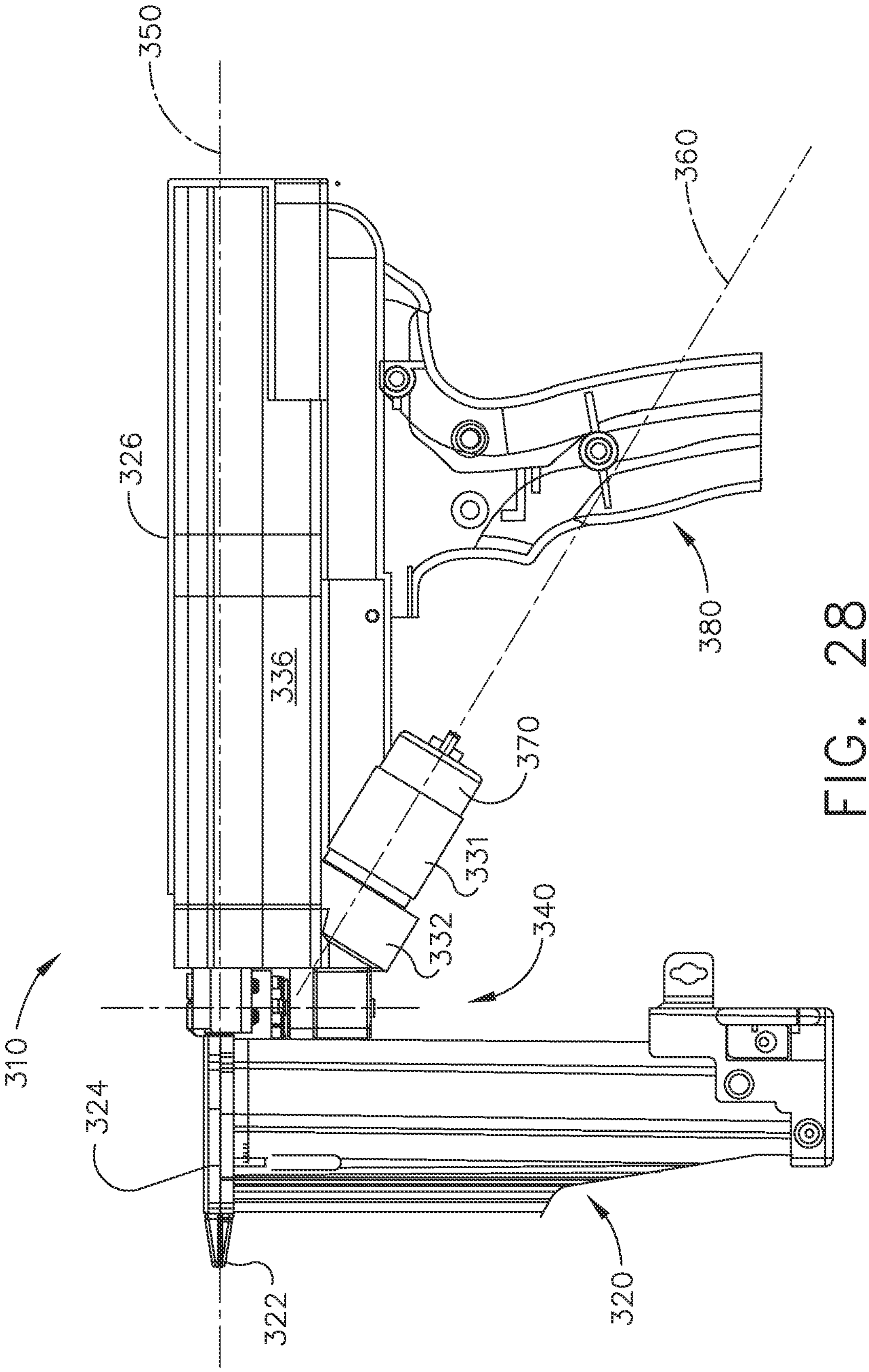
FIG. 28 is a left side elevational view of a fastener driving tool similar to that illustrated in FIG. 27, showing a different alternative placement of the motor and gear train.

Referring now to FIG. 28, a similar tool to that shown in FIG. 27 is illustrated, but this time with a tilt angle of about 30 degrees for the motor and mechanical drivetrain, as another possible alternative configuration. In FIG. 28, the overall tool is generally designated by the reference numeral 310, having an outer front wall 326 and a left-side pressure chamber outer wall 336 (essentially the same as in the first embodiment tool 10 of FIG. 1). This tool 310 includes a fastener magazine 320 that is similar to the magazine 245 illustrated in FIG. 27, and it includes a trigger handle 380, which is similar to the trigger handle 280. However, the entire trigger handle is (again) not shown on FIG. 28, including the bottom-most portion that typically would extend to a battery pack (also not shown).

An outer housing for the entire tool is again not illustrated in FIG. 28, again for purposes of clarity. However, a guide body 324 and the fastener exit end of the tool at 322 are shown just above the magazine 320.

The tool 310 of FIG. 28 includes a motor 370 with a motor housing 331, and a gearbox with a housing 332. The output portion of the gearbox 332 angles into a lifter subassembly 340, which is similar to the lifter subassembly 70 of the first embodiment tool 10. At least one of the centerline of the rotating portion of the motor 370 and/or the centerline of the geartrain's rotating output portion defines a 'tilted' longitudinal axis 360, somewhat similar to the axis 260 illustrated in FIG. 27.

The longitudinal axis of the working cylinder is depicted at the reference numeral 350. (This axis 350 will sometimes be referred to herein as the "first longitudinal axis." The 'tilted' longitudinal axis 360 will sometimes be referred to herein as the "second longitudinal axis.")

As can be seen from viewing FIG. 28, the approximate angle between the line 350 and line 360 is about 30 degrees. And, as noted above, the plane of the tilt angle (between lines 350 and 360) does not necessarily need to be in the vertical direction. In other words, the motor 370 and its gearbox 332 could extend not only 'down' in this view of FIG. 28, but also somewhat off to the left side of the tool 310. In summary, the angle between the first and second longitudinal axes is about 30 degrees on FIG. 28.

Figure 29:
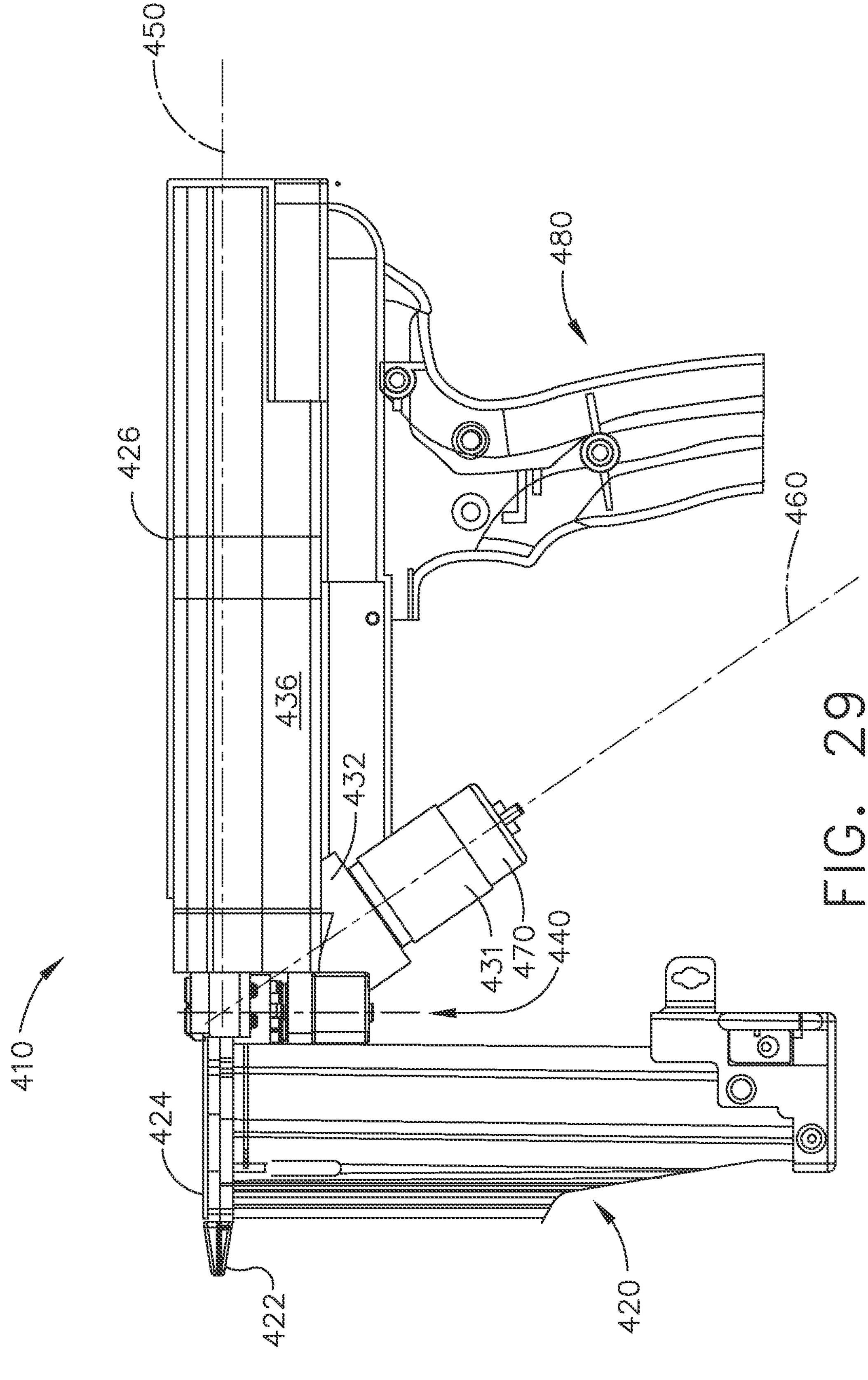
FIG. 29 is a left side elevational view of a fastener driving tool similar to that illustrated in FIG. 28, showing a yet different alternative placement of the motor and gear train.

Referring now to FIG. 29, a similar tool to that shown in FIG. 28 is illustrated, but this time with a tilt angle of about 60 degrees for the motor and mechanical drivetrain, as another possible alternative configuration. In FIG. 29 the overall tool is generally designated by the reference numeral 410, having an outer front wall 426 and a left-side pressure chamber outer wall 436 (essentially the same as in the first embodiment tool 10 of FIG. 1). This tool 410 includes a fastener magazine 420 that is similar to the magazine 245 illustrated in FIG. 27, and it includes a trigger handle 480, which is similar to the trigger handle 280. However, the entire trigger handle is (again) not shown on FIG. 29, including the bottom-most portion that typically would extend to a battery pack (also not shown).

An outer housing for the entire tool is again not illustrated in FIG. 29, again for purposes of clarity. However, a guide body 424 and the fastener exit end of the tool at 422 are shown just above the magazine 420.

The tool 410 of FIG. 29 includes a motor 470 with a motor housing 431, and a gearbox with a housing 432. The output portion of the gearbox 432 angles into a lifter subassembly 440, which is similar to the lifter subassembly 70 of the first embodiment tool 10. At least one of the centerline of the rotating portion of the motor 470 and/or the centerline of the geartrain's rotating output portion defines a 'tilted' longitudinal axis 460, somewhat similar to the axis 260 illustrated in FIG. 27.

The longitudinal axis of the working cylinder is depicted at the reference numeral 450. (This axis 450 will sometimes be referred to herein as the "first longitudinal axis." The 'tilted' longitudinal axis 460 will sometimes be referred to herein as the "second longitudinal axis.")

As can be seen from viewing FIG. 29, the approximate angle between the line 450 and line 460 is about 60 degrees. And, as noted above, the plane of the tilt angle (between lines 450 and 460) does not necessarily need to be in the vertical direction. In other words, the motor 470 and its gearbox 432 could extend not only 'down' in this view of FIG. 29, but also somewhat off to the left side of the tool 410. In summary, the angle between the first and second longitudinal axes is about 60 degrees on FIG. 29.

Figure 30:
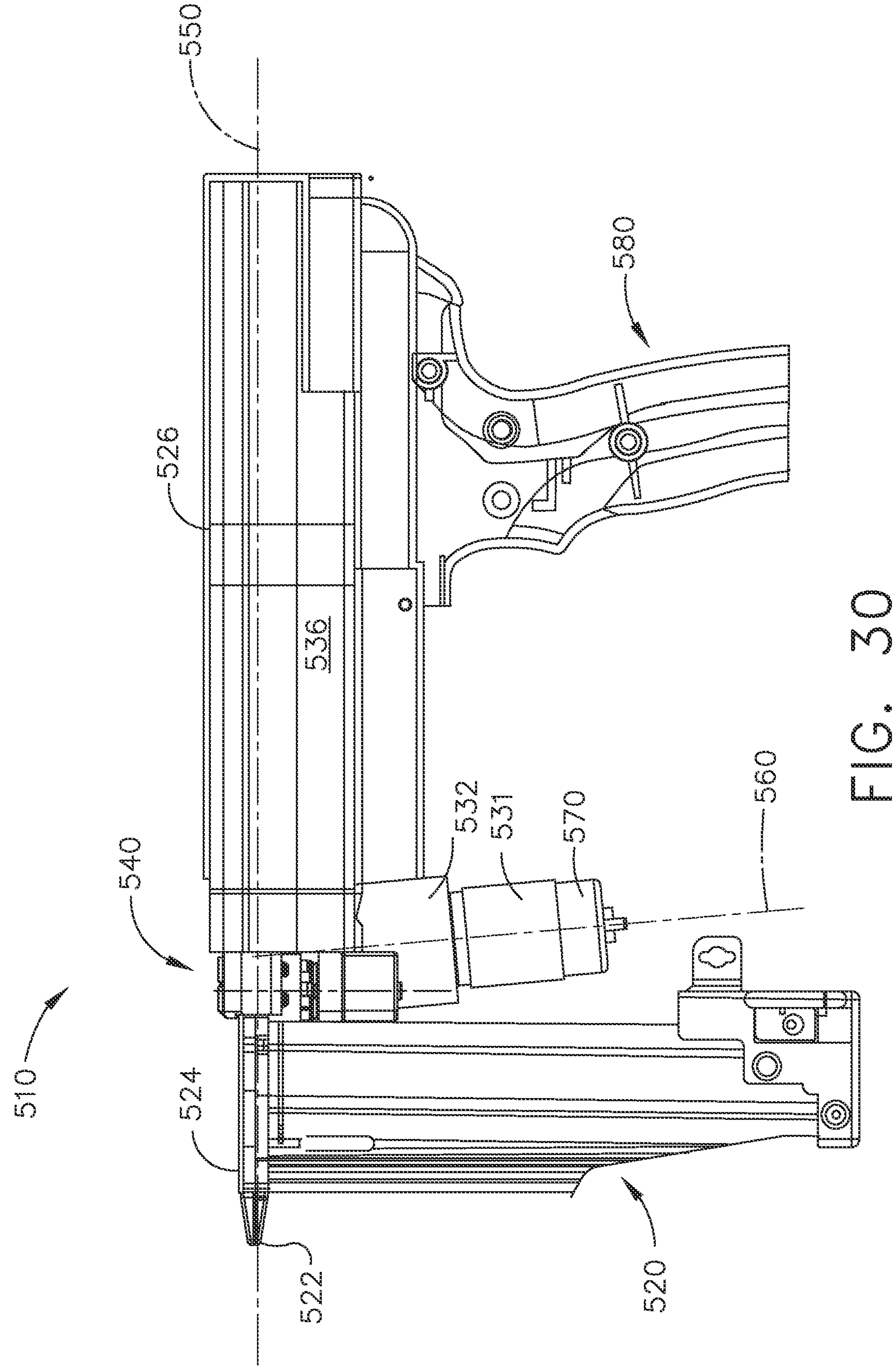
FIG. 30 is a left side elevational view of a fastener driving tool similar to that illustrated in FIG. 29, showing a still different alternative placement of the motor and gear train.

Referring now to FIG. 30, a similar tool to that shown in FIG. 29 is illustrated, but this time with a tilt angle of about 85 degrees for the motor and mechanical drivetrain, as another possible alternative configuration. In FIG. 30 the overall tool is generally designated by the reference numeral 510, having an outer front wall 526 and a left-side pressure chamber outer wall 536 (essentially the same as in the first embodiment tool 10 of FIG. 1). This tool 510 includes a fastener magazine 520 that is similar to the magazine 245 illustrated in FIG. 27, and it includes a trigger handle 580, which is similar to the trigger handle 280. However, the entire trigger handle is (again) not shown on FIG. 30, including the bottom-most portion that typically would extend to a battery pack (also not shown).

An outer housing for the entire tool is again not illustrated in FIG. 30, again for purposes of clarity. However, a guide body 524 and the fastener exit end of the tool at 522 are shown just above the magazine 520.

The tool 510 of FIG. 30 includes a motor 570 with a motor housing 531, and a gearbox with a housing 532. The output portion of the gearbox 532 angles into a lifter subassembly 540, which is similar to the lifter subassembly 70 of the first embodiment tool 10. At least one of the centerline of the rotating portion of the motor 570 and/or the centerline of the geartrain's rotating output portion defines a 'tilted' longitudinal axis 560, somewhat similar to the axis 260 illustrated in FIG. 27.

The longitudinal axis of the working cylinder is depicted at the reference numeral 550. (This axis 550 will sometimes be referred to herein as the "first longitudinal axis." The 'tilted' longitudinal axis 560 will sometimes be referred to herein as the "second longitudinal axis.")

As can be seen from viewing FIG. 30, the approximate angle between the line 550 and line 560 is about 85 degrees. And, as noted above, the plane of the tilt angle (between lines 550 and 560) does not necessarily need to be in the vertical direction. In other words, the motor 570 and its gearbox 532 could extend not only 'down' in this view of FIG. but also somewhat off to the left side of the tool 510. In summary, the angle between the first and second longitudinal axes is about 85 degrees on FIG. 30.

As noted above, one reason for somewhat separating the combination of the motor and gearbox from the pressure chamber would be to enhance the potential cooling of the relatively 'hot' motor, while in operation. Another possible reason could be to move the center of mass of the overall tool, if that should become desirable. Depending on the overall power requirements for this type of fastener driving tool, including the possibility, for example, of using high-strength (and potentially high-mass) nails, or perhaps changing the weight of the magazine, or the pressure chamber, or the lifter subassembly, or the motor and gearbox, or the battery pack and the electronics of the system controller, etc.—any of these components could change weight dramatically, and not necessary in proportion at the same rate as the needed power could be increased for a given tool size.

The example embodiments depicted in FIGS. 27-30 generally show various angles that could be provided between the centerline of the working cylinder—i.e., one of the lines 150, 350, 450, or 550—and the centerline of rotation of the motor—i.e., one of the lines 260, 360, 460, or 560. Moreover, the centerline of the motor rotation in FIG. 27 is also illustrated as possibly being at the line 250, which would be parallel to the centerline 150 of the working cylinder in that view—i.e., the angle between lines 150 and 250 is zero degrees—although, geometrically speaking, those lines never intersect, even if they are in the same plane. All of these alternative motor/cylinder orientations are different than any of the conventional FUSION-type tools, which all have angles between their motors and working cylinders of 90 degrees; i.e., those conventional tools are all at a perpendicular orientation. (Note: their exact centerlines may not intersect if they are in different planes, however, if viewed from one side of the tool—as in the views of FIGS. 27-30—their lines would have the appearance of intersecting at a right angle.

It should be noted that an angle of zero degrees between the centerline of the working cylinder and the rotational portion of the motor, and/or its gearbox, is the most preferred angle for most purposes, as in the tool illustrated on FIGS. 6, 14, and 16, for example. However, as stated above, for some purposes, such as for cooling the motor and/or for changing the center of gravity of the overall tool, some of the alternative angles almost to degrees could offer an advantage. For the purposes of this technical disclosure, it will be assumed that the closer this angle is to zero degrees, the better (or the more preferred). Yet this cannot be truly determined until the designer of the tool has selected the exact materials to be used in the tool's construction, and further, the final shape and size of the tool's outer housing (or enclosure—such as a clamshell enclosure) must be determined before making a final decision about the 'best' (or most preferred) angle is finally decided upon. Additionally, the size of the fasteners (e.g., nails) should also be considered, although the mass of such fasteners will typically be variable as the magazine is emptied during use of the tool.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

Note that some of the embodiments illustrated herein do not have all of their components included on some of the figures herein, for purposes of clarity. To see examples of such outer housings and other components, especially for earlier designs, the reader is directed to other U.S. patents and applications owned by Kyocera Senco. Similarly, information about "how" the electronic controller operates to control the functions of the tool is found in other U.S. patents and applications owned by Kyocera Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, 8,602,282, 9,676,088, 10,478,954, 9,993,913, 10,549,412, 10,898,994, 10,821,585 and 8,763,874; also published U.S. patent application No. 2020/0156228, published U.S. patent application No. 2021/0016424, published U.S. patent application No. 2020/0070330, published U.S. patent application No. 2020/0122308, and U.S. provisional patent application No. 63/331,993 filed on Apr. 18, 2022. These documents are incorporated by reference herein, in their entirety.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A portable fastener driving tool, comprising:

a pressurized gas system comprising:

a pressure chamber including a first side storage chamber and a second side storage chamber; and a working cylinder that includes a movable piston, wherein the working cylinder exhibits a first end, an opposite second end, and a longitudinal axis that extends at least between the first end and the second end;

wherein:

the pressure chamber extends along the longitudinal axis of the working cylinder, and exhibits an inverted U-shape in transverse cross-section, the inverted U-shape having a top bend portion, a first extended leg, and a second extended leg;

the working cylinder is located proximal to the top bend portion of the inverted U-shape;

the first side storage chamber is located at the first extended leg of the inverted U-shape, and extends along a first side portion of the working cylinder;

the second side storage chamber is located at the second extended leg of the inverted U-shape, and extends along a second side portion of the working cylinder;

the first side storage chamber and the second side storage chamber are operable to be in fluidic communication with at least a portion of the working cylinder; and the pressure chamber is operable to contain pressurized gas.

2. The tool of claim 1, further comprising: an end cap that is mounted proximal to the second end of the working cylinder, the end cap having an open space, wherein the first side storage chamber, the second side storage chamber, and the open space of the end cap are all in fluidic communication.

3. The tool of claim 1, wherein:

during operation, the movable piston exhibits a reciprocating motion that has a first end travel position and an opposite second end travel position such that the movements of the movable piston between the first and second end travel positions define:

a variable venting volume on a first side of the movable piston that is proximal to the first end of the working cylinder; and a variable displacement volume on a second side of the movable piston that is proximal to the second end of the working cylinder; and wherein the variable displacement volume is in fluidic communication with both the first side storage chamber and the second side storage chamber at all times during operation.

4. The tool of claim 3, further comprising: an end cap that is mounted proximal to the second end of the working cylinder, the end cap having an open space, wherein the first side storage chamber, the second side storage chamber, the variable displacement volume, and the open space of the end cap are all in fluidic communication at all times during operation.

5. The tool of claim 4, wherein the end cap exhibits a mating surface to at least the first side storage chamber and the second side storage chamber, and further comprises a seal at the mating surface to prevent pressurized gas from escaping.

6. The tool of claim 1, wherein: the first side storage chamber and the second side storage chamber are not operable to be in fluidic communication with each other except at a space that is proximal to the second end of the working cylinder.

7. The tool of claim 1, further comprising:

a guide body that is proximal to the first end of the working cylinder; and a movable driver that is in communication with the movable piston at least during a drive stroke;

wherein:

the guide body includes a linear space to allow the movable driver to pass therethrough so as to drive a fastener from an exit end of the guide body; and the working cylinder, the first side storage chamber, and the second side storage chamber all mount to the guide body.

* * * * *